US010732865B2

United States Patent
Jain et al.

(10) Patent No.: US 10,732,865 B2
(45) Date of Patent: Aug. 4, 2020

(54) DISTRIBUTED SHARED MEMORY USING INTERCONNECTED ATOMIC TRANSACTION ENGINES AT RESPECTIVE MEMORY INTERFACES

(71) Applicant: Oracle International Corporation, Redwood City, CA (US)

(72) Inventors: Rishabh Jain, Austin, TX (US); Erik M. Schlanger, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 126 days.

(21) Appl. No.: 14/863,354

(22) Filed: Sep. 23, 2015

(65) Prior Publication Data
US 2017/0083257 A1    Mar. 23, 2017

(51) Int. Cl.
*G06F 12/00*      (2006.01)
*G06F 3/06*       (2006.01)
(Continued)

(52) U.S. Cl.
CPC .......... *G06F 3/0631* (2013.01); *G06F 3/0604* (2013.01); *G06F 3/067* (2013.01);
(Continued)

(58) Field of Classification Search
CPC ................. G06F 9/45558; G06F 9/547; G06F 17/30864; G06F 3/0631; G06F 3/0604;
(Continued)

(56) References Cited

U.S. PATENT DOCUMENTS 5,617,570 A *  4/1997  Russell .................. H04L 29/06
                                                719/312
5,987,506 A * 11/1999  Carter ................... G06F 9/5016
                                                707/999.01
(Continued)

FOREIGN PATENT DOCUMENTS

EP          0614139        9/1994
WO       2014210172        9/2014

OTHER PUBLICATIONS

"Editor", "Know more about your laptop parts", Feb. 20, 2014; retrieved from: http://www.techadvisory.org/2014/02/know-more-about-your-laptops-parts/.*

(Continued)

*Primary Examiner* — Arvind Talukdar
(74) *Attorney, Agent, or Firm* — Robert C. Kowert; Kowert, Hood, Munyon, Rankin & Goetzel, P.C.

(57) ABSTRACT

A hardware-assisted Distributed Memory System may include software configurable shared memory regions in the local memory of each of multiple processor cores. Accesses to these shared memory regions may be made through a network of on-chip atomic transaction engine (ATE) instances, one per core, over a private interconnect matrix that connects them together. For example, each ATE instance may issue Remote Procedure Calls (RPCs), with or without responses, to an ATE instance associated with a remote processor core in order to perform operations that target memory locations controlled by the remote processor core. Each ATE instance may process RPCs (atomically) that are received from other ATE instances or that are generated locally. For some operation types, an ATE instance may execute the operations identified in the RPCs itself using dedicated hardware. For other operation types, the ATE
(Continued)

instance may interrupt its local processor core to perform the operations.

20 Claims, 13 Drawing Sheets

(51) Int. Cl.
  *G06F 9/54* (2006.01)
  *G06F 15/78* (2006.01)
  *G06F 15/173* (2006.01)
  *G06F 9/52* (2006.01)
(52) U.S. Cl.
  CPC .............. *G06F 9/526* (2013.01); *G06F 9/547* (2013.01); *G06F 15/17331* (2013.01); *G06F 15/7825* (2013.01)
(58) Field of Classification Search
  CPC .... G06F 3/067; G06F 15/17331; G06F 9/526; G06F 15/7825
  See application file for complete search history.

(56) References Cited

U.S. PATENT DOCUMENTS

| | | | | |
|---|---|---|---|---|
| 6,631,439 | B2 * | 10/2003 | Saulsbury | G06F 15/7857 711/104 |
| 2003/0061395 | A1 | 3/2003 | Kingsbury et al. | |
| 2003/0217104 | A1 | 11/2003 | Hamdan et al. | |
| 2011/0055372 | A1 | 3/2011 | Elyashev et al. | |
| 2011/0125974 | A1 * | 5/2011 | Anderson | G06F 12/084 711/153 |
| 2012/0089762 | A1 | 4/2012 | Zhu et al. | |
| 2013/0212148 | A1 * | 8/2013 | Koponen | G06F 9/45558 709/201 |
| 2014/0032761 | A1 | 1/2014 | Beveridge | |
| 2014/0089572 | A1 * | 3/2014 | Koka | G06F 12/1009 711/105 |
| 2014/0137112 | A1 | 5/2014 | Rigolet | |
| 2014/0181421 | A1 | 6/2014 | O'Connor et al. | |
| 2014/0207871 | A1 | 7/2014 | Miloushev et al. | |
| 2014/0250276 | A1 | 9/2014 | Blaner et al. | |
| 2014/0280898 | A1 | 9/2014 | Voit et al. | |
| 2015/0215386 | A1 | 7/2015 | Walsky et al. | |
| 2016/0357702 | A1 * | 12/2016 | Shamis | G06F 15/167 |

OTHER PUBLICATIONS

Wolf, "Computers as Components: Principles of Embedded Computer System Design", 2008, Elsevier, 2nd Edition, pp. 413-416; retrived from: http://www.bookspar.com/wp-content/uploads/vtu/notes/cs/7th-sem/ecs-72/computers-as-components-principles-of-embedded-computing-system-design-2nd-edition-wayne-wolf-elsevier-2008-%5Bbookspar.com%5D.pdf.*
"Switching" slides, Cornell University, 1999; retrieved from: http://www.cs.cornell.edu/skeshav/book/slides/index.html.*
"What is a network", 2014, BBC, all; retrieved from: http://www.bbc.co.uk/schools/gcsebitesize/ict/datacomm/2networksrev1.shtml.*
Snoeren, "Network File System/RPC", 2006, Univ. Cal. San Diego, slides; retrieved from: https://cseweb.ucsd.edu/classes/fa06/cse120/lectures/120-fa06-l15.pdf.*
Thorvaldsson, "Atomic Transfer for Distributed Systems", 2009, WUSL, pp. 25-53; retrieved from: http://citeseerx.ist.psu.edu/viewdoc/download;jsessionid=41A7E344411C590069B1A92FB1E590C3?doi=10.1.1.466.2829&rep=rep1&type=pdf.*
"FAQ: TR-069", 2013, Incognito, all; retrieved from: https://www.incognito.com/tips-and-tutorials/faq-tr-069/.*
Bond et al. "Using RPC-Style Web Services with J2EE", 2002, Pearson Education, all; retrieved from: http://www.informit.com/articles/printerfriendly/29416.*
Renesse et al., "Connecting RPC-Based Distributed System Using Wide-Area Networks", 1987; retrieved from: https://pdfs.semanticscholar.org/0360/65a536609fdc36adf1b31d6acaaa23b12419.pdf?_ga=2.62631596.1823017162.1531731074-2012032928.1531155040.*
Pautasso, "Remote Procedure Call", 2006, ICSRG, retrieved from: https://disco.ethz.ch/courses/ss06/vs/material/chapter7/RPC_4.pdf.*
Plusquellic, "Distributed Shared-Memory Architectures", 1999; CSEE, UMBC; retrieved from: http://ece-research.unm.edu/jimp/611/slides/chap8_3.html.*
Kavi et al. "Shared memory and distributed System: A survey", 2000. Elsevier, all; retrieved from: http://web.engr.oregonstate.edu/~benl/Publications/Book_Chapters/Advances_in_Computers_DSM00.pdf.*
Protic et al. Distributed Shared Memory: Concepts and Systems, 1996, IEEE, all; retrieved from: https://www.cc.gatech.edu/classes/AY2009/cs4210_fall/papers/DSM_protic.pdf.*
Brown, "Distributed Shared Memory", 2006, all; retrieved from: http://www.cs.toronto.edu/~demke/469F.06/Lectures/Lecture16.pdf.*
Mazzucco et al. "Engineering Distributed Shared Memory Middleware for Java", 2009, Springer-Verlag Berlin Heidelberg , all, retrieved from: https://pdfs.semanticscholar.org/9323/fba3989edd3975ec2b1aa91d6003b05cd2e3.pdf.*
Schmidt et al. "Using Shared Memory for Read-Mostly RPC Services", 1996, IEEE, all; retrieved from: https://ieeexplore.ieee.org/stamp/stamp.jsp?tp=&arnumber=495457.*
Message Passing, Remote Procedure Calls and Distributed Shared Memory as Communication Paradigms for Distributed Systems', 2014 (Year: 2014).*
https://docs.oracle.com/cd/E19253-01/816-4555/6maoqujgp/index.html, 2010 (Year: 2010).*
http://www.cs.cornell.edu/courses/cs6410/2009fa/lectures/11-rpc.pdf (Year: 2009).*
Optimized Memory-Based Messaging: Leveraging the Memory System for High-Performance Communication (Year: 1994).*
Furukwa, 'A Hardware/Software Cosimulator with RTOS support for multiprocessor embedded systems', 2007 (Year: 2007).*
WO 01/67273 A2,Saulsbury (Year: 2001).*
International Search Report and Written Opinion from PCT/US2016/052968, dated Dec. 2, 2016, Oracle International Corporation, pp. 1-16.
International Search Report and Written Opinion from PCT/US2016/053063, dated Dec. 2, 2016, Amazon Technologies, Inc., pp. 1-11.

* cited by examiner

DISTRIBUTED SHARED MEMORY USING INTERCONNECTED ATOMIC TRANSACTION ENGINES AT RESPECTIVE MEMORY INTERFACES

BACKGROUND

Field of the Disclosure

This disclosure relates generally to distributed shared memory systems and more particularly to systems and methods for utilizing dedicated on-chip hardware to perform atomic transactions on nearby data.

Description of the Related Art

As the number of processors in a system continues to grow, maintaining data consistency and hardware scalability is critical. However, traditional shared memory systems (e.g., virtual memory systems) and traditional distributed memory systems are unable to satisfy these requirements, particularly in multi-processor systems in which multiple processes operate on shared memory. A Distributed Shared Memory (DSM) system, which aims to address both of these problems, typically consists of multiple independent processing nodes (each having local memory modules) that talk to each other directly or indirectly using a general interconnect network. In typical DSMs, shared data is distributed using either a replication strategy or a migration strategy. Replication allows multiple copies of the same data items to reside in different local memories or caches. This approach allows a requestor to access data items locally, once the data items have been replicated in the requestor's local memory.

By contrast, migration allows only a single copy of data to exist at any given time. Therefore, under a migration strategy, data items must be moved to the requestor's local memory for exclusive use. Since both replication and migration strategies involve moving data closer to the processor that wants to operate on it, they both incur significant overhead in order to maintain data consistency across all processing nodes. This overhead is largely due to the complexity of the hardware involved. For example, these systems typically include hardware mechanisms such as synchronous or coherent caches, coherent fabrics and/or snoop logic. In addition, accessing shared data in DSMs typically involves significant latencies compared to data accesses that target local memory. These latencies can be due to the steps involved in migrating the target data items to local memory and updating the corresponding directory structures to reflect this movement, or can be due to the cache flush and invalidate operations that are required to maintain data consistency in the system.

SUMMARY

In various embodiments, the systems described herein may include a hardware-assisted Distributed Memory System (DSM) in which different software configurable portions of the distributed shared memory are controlled by respective ones of multiple processor cores. In some embodiments, all accesses to these shared memory regions may be made through a network of on-chip atomic transaction engine (ATE) instances. For example, there may be one ATE instance per core, and all of the ATE instances may communicate with each other over a dedicated low-latency interconnect matrix.

In some embodiments, software executing on each processor core or hardware within each processor pipeline may be configured to determine whether a given operation of a distributed application should be performed by another one of the processor cores using a Remote Procedure Calls (RPC). For example, if an operation targets a location in memory that is controlled by a different processor, information about the operation may be passed to the local ATE instance. The ATE instance may generate and issue an RPC frame, for an RPC with or without response, corresponding to the operation. The RPC frame may include a descriptor that indicates the operation type, the target address for the operation, and payload information (e.g. operation operands), if applicable. If the target location is controlled by a remote processor core, the local ATE instance may send the RPC frame to the ATE instance associated with the remote processor core, which may place information about the received RPC frame in its local receive queue. If the target location is controlled by the local processor core, the local ATE instance may place information about the RPC in a local receive queue for subsequent processing.

In at least some embodiments, each ATE instance may retrieve RPCs from its local receive queue and process them (atomically), regardless of whether they were received from other ATE instances or were generated locally. For some operation types, an ATE instance may execute the operations identified in the RPCs that it retrieves from its local queue itself using dedicated hardware. For example, the ATE may include dedicated circuitry for performing some relatively simple operations (e.g., read, write, increment, add, or compare-and-swap) without intervention by the local processor core. For other operation types, the ATE instance may interrupt its local processor core to perform the operations.

In some embodiments, if an RPC requires a response (e.g., if it is an RPCWR), the processor core on whose behalf the operation is to be performed may perform one or more other operations after passing the operation off to its local ATE instance for handling. At some point (e.g., when the processor core requires the response data), it may issue a "wait for event" instruction, where the event is the return of an RPC response packet from the ATE instance associated with a remote core that performed the operation. For example, in some embodiments, an ATE instance may generate an RPC response frame for a received RPCWR and return it to the originating ATE instance. In some embodiments, when an ATE instance receives an RPC response frame, it may return the response data to its local processor core or may write it into a memory location from which the local core expects to retrieve it.

In at least some embodiments, a distributed shared memory system that employs an ATE network (as described herein) may be lighter weight and less complex than a full cache coherent network. For example, by moving operations closer to the data on which they operation (rather than moving data close to the processors that initiate those operations) the systems described herein may achieve higher overall performance and/or may be more flexible than existing DSMs.

Figure 1:
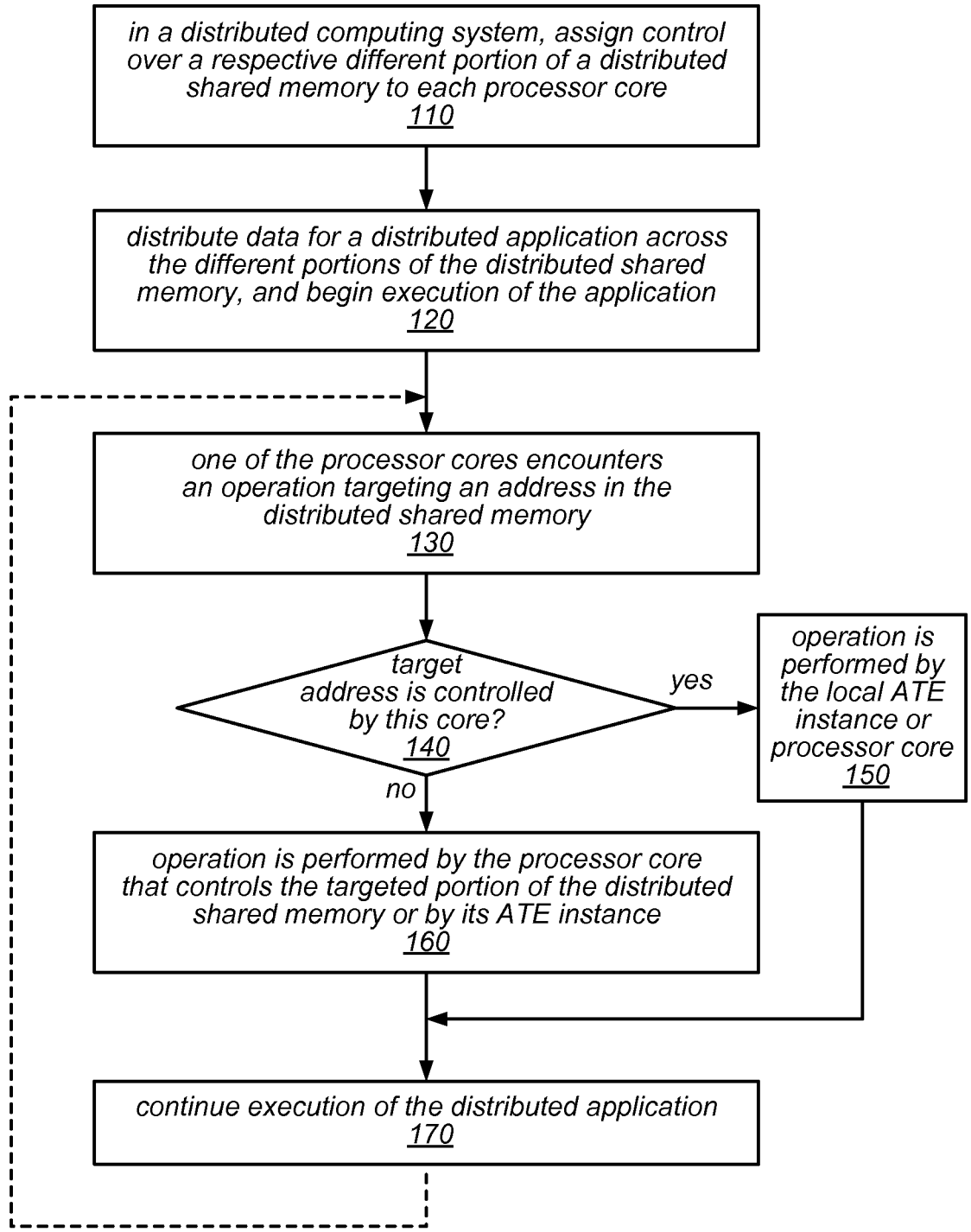
FIG. 1 is a flow diagram illustrating one embodiment of a method for utilizing an atomic transaction engine in a distributed computing system.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, in traditional distributed memory systems, the shared data is distributed using either a replication or migration strategy. Both replication and migration strategies involve moving data closer to the processor that wants to operate on it, and both strategies incur significant overhead in order to maintain data consistency across all processing nodes. In various embodiments, the hardware-assisted distributed memory systems described herein may include software configurable shared memory regions in each individual core's local memory as well as in the main system memory. In these systems, access to the shared memory regions may be through a network of on-chip Atomic Transaction Engine (ATE) instances (e.g., one per processor core), and a private interconnect matrix that connects all of the ATE instances together. Each ATE instance may issue Remote Procedure Calls (RPCs) to other ATE instances for operations in which the target address of the operation falls in another core's local memory. In addition, each ATE instance may process RPCs received from other ATEs. Note that, in at least some embodiments, an RPC that is being processed by an ATE instance may be considered a blocking instruction in the sense that the ATE will not accept any more transactions (RPC issued requests) until execution of the current RPC is finished.

In contrast to traditional DSMs that move shared data to bring it closer to the processors that want to operate on it (through migration or replication), the systems described herein take the approach of leaving shared data in place and using the processing power that is already in place close to that data (either in the form of the local processor core or an associated ATE instance) to operate on the data. For example, in some embodiments, each ATE instance may govern accesses to a respective portion of a distributed shared memory, regardless of which processor wants to operate on data that resides in that portion of the distributed shared memory. In some embodiments, each ATE instance may provide a simple instruction set and may perform RPC operations in hardware for RPCs that use those instructions and that target an address in the portion of the shared memory that is governed by the ATE instance. For other operations, the ATE may enlist its local processor core to perform RPC operations that target an address in the portion of the shared memory that is governed by the ATE instance In some embodiments, the approach described herein may alleviate the need to move shared data while still guaranteeing data consistency. In other embodiments, although data coherency may not be guaranteed, the need for hardware enforced data coherency may be significantly reduced by a combination of constructs provided by the ATE instances and by providing simple rules for the software to follow. For example, these constructs may be used to simulate coherency, and if they are used as intended, the system may exhibit coherency. Note that, in some embodiments, including those in which distributed shared memory is used for storing variables that are used for synchronization (e.g., in semaphores and mutexes) or for message passing, this hybrid approach may reduce the hardware costs significantly when compared to earlier approaches (e.g., no coherent cache networks are needed) with only a marginal increase in software complexity.

As described in more detail herein, if one processor wants to access data in a portion of a distributed shared memory that is controlled by another processor, instead of moving the desired data closer to the requesting processor, the requesting processor (or, more specifically, an ATE instance associated with the requesting processor) may send an RPC frame over a dedicated ATE network to the processor that controls the targeted portion of the distributed shared memory (or, more specifically, to an ATE instance associated with the destination processor). In at least some embodiments, the RPC frame may pass through the dedicated ATE network in much less time that it would take to perform a data migration or to perform the cache flush and invalidate operations that are required to maintain data consistency for replicated data.

In some embodiments, when the RPC frame reaches the destination processor, an ATE instance that is associated with the destination processor may access the shared memory space controlled by that processor either through that processor's local data memory (DMEM) or through data caches that access the main system memory (e.g., DDR memory). In some cases, the ATE instance may include functionality that allows it to handle some of the RPCs on its own (e.g., without interrupting the processor). In those cases, the processor may be working on something else (e.g., executing its own instructions or performing its own tasks) while the ATE instance accesses the targeted memory location and performs the operation indicated in the received RPC frame. In other words, when an ATE receives an RPC request frame, it may be configured to determine whether the RPC operation described in the RPC request frame is something that it can handle in hardware (e.g., on its own). If it can, it may access the targeted address through its own interface to the locally accessible portion of the distributed shared memory (which is sometimes referred to herein as the DMEM) or local data cache, process the data (as specified in the RPC request frame) and send a response back to the original requestor (or its ATE instance), if needed.

In some embodiments of the systems described herein, the ATE instances may provide the capability of performing simple operations on the shared data on-the-fly. In these systems, the most recent copy of the shared data does not need to be moved to a remote core before a logical, arithmetic or other operation can be performed on it. Instead, the processing power that exists near the data may be used to perform the operation and a lot of the overhead that is associated with trying to keep caches coherent may be avoided.

In at least some embodiments, the ATE implementation may define a framework of RPC operations (some of which are implemented in hardware within the ATE instances, and others of which may be defined by software and/or may require action by the local processor core). This framework may allow shared data to be operated on before it is sent to the requesting core. In other words, rather than shipping the operands for an operation to a requesting core, a description of the operation may be sent from the requesting core to the core that controls the target data. Various ones of the RPCs may or may not require data to be returned. In some embodiments, and for some RPCs, the data returned as part of an RPC response frame may be stored as the value of a new local variable (e.g., in a special purpose register or in the requesting core's local memory) for further processing.

While some of the RPC requests that are automatically handled by the ATE hardware may be relatively simple operations, in some embodiments, the ATE instances may be able to handle more complicated operations (e.g., operations related to passing large messages from one core to another, operations that consist of a combination or sequence of relatively simple operations, or other operations for which dedicated hardware has been included the ATE instances for a specific function). In some embodiments, the ATE instances may know that the RPCs having an RPC identifier (an RPCID) within a particular range of RPCID values are RPCs that it can process on its own (e.g., without interrupting the processor core). On the other hand, in order to process RPCs having an RPCID value that lies outside this range, the ATE instances may need interrupt the local processor core. In those cases, the local processor core may take an interrupt and process the RPC frame appropriately. In some embodiments, the software executing on a local processor may issue RPCs directly and/or may have control over decisions about whether or not to issue an RPC.

As noted above, in some embodiments, all accesses to shared address space may go out on the ATE private interconnect. This may help to reduce the latency of accessing shared data while still keeping the hardware costs down (when compared to cache coherency based DSMs). In such embodiments, the network of ATE instances may serve as a single access point for the shared address space within the DMEM (or at least the shared portion of the DMEM). For example, a given core may control a particular region of the shared memory, and that portion of the shared memory should be in its own DMEM. However, all of the other processor cores may also be able access that particular region of the shared memory. In this example, it may be undesirable to create a situation in which the local ATE instance is operating on a location in the particular region of the shared memory on behalf of another core while the local core directly accesses its DMEM and modifies the data in that location, since this would break atomicity guarantees (which are important in distributed shared memory systems). Therefore, in some embodiments, any accesses to the particular region of the shared memory, even by a local processor core that already has direct access to that memory location through its DMEM interface, its data cache interface, or any other interface, may need to request that the ATE instance sends out an RPC frame. In this case, the ATE instance may, in effect, be sending an RPC frame to itself, indicating that it want to perform this operation. Note that, in general, the shared memory region may be in the local DMEM or in the main memory (in which case it may be accessed by the ATE through the processor core's data cache). Therefore, references to the DMEM in the descriptions herein may, in some embodiments, apply to the data cache instead.

As described in more detail herein, in the case that the ATE instance sends an RPC frame to itself, the ATE instance may recognize the RPC frame as something that it needs to process and may queue it up in a local RPC receive queue. Note that, in at least some embodiments, operations may not be intermingled in the receive queue (e.g., the ATE instances operate on RPC boundaries). In such embodiments, once an ATE instance starts processing an operation for a particular processor core (e.g., the local processor core or a remote processor core), it may not stop and start working on something for another core until it finishes what it was doing for the particular processor core. In other words, the ATE instance may treat each RPC frame as if it represents an atomic transaction, and may not pick up another operation from the RPC receive queue until it the previous operation is complete. In this way, the system may guarantee that, if the local core tries to access the portion of the shared memory that it controls, it cannot overwrite or otherwise corrupt the data that another core may be accessing at the same time.

One embodiment of a method for utilizing an atomic transaction engine in a distributed computing system is illustrated by the flow diagram in FIG. 1. As illustrated at 110, in this example, the method may include assigning control over a respective different portion of a distributed shared memory to each processor core in the distributed computing system. The method may also include distributing data for a distributed application across the different portions of the distributed shared memory, and beginning execution of the application, as in 120.

As illustrated in FIG. 1, the method may include one of the processor cores encountering an operation targeting an address in the distributed shared memory, as in 130. If the target address is controlled by this core (shown as the positive exit from 140), the method may include the local ATE instance or this processor core performing the operation (as in 150). However, if the target address is not controlled by this core (shown as the negative exit from 140), the method may include the processor core that controls the targeted portion of the distributed shared memory (or its ATE instance) performing the operation (as in 160). In either case, the method may include continuing execution of the distributed application, as in 170 (e.g., without necessarily waiting for the operation to be completed by a remote processor core). Note that, as shown by the dashed line from 170 to 130 in FIG. 1, the operations illustrated in 130-160 may be repeated when any of the processor cores in the distributed computing system encounters such an operation.

As noted above, in at least some embodiments, an ATE instance may act as the single access point for the shared address space in its local processor core's data memory (DMEM) as well as for the portion of main system memory marked as shared and assigned to the local core for gate keeping. In such embodiments, all accesses to a shared region must go through the associated ATE instance even if the local core has direct access to that region (either because it resides in its local DMEM or through its data cache). In at least some embodiments, an ATE instance may be given direct access to its local core's data cache (sometimes denoted herein as the D$) and DMEM, which may allow it to operate on the shared data without interrupting the local native processor core. In some embodiments, depending on the DMEM and D$ organization, it may be possible for the ATE instance to operate on shared data in parallel with its local core's normal execution, which may increase the overall performance of the system. In some embodiments, there may be an ATE instance for each processor chip (or processor core thereof) in the system, and these ATE instances may be connected to (and communicate with) each other over a dedicated low-latency interconnect that is separate from the normal bus structure. In other embodiments, the ATE instances may communicate with each other over the system interconnect.

Figure 2:
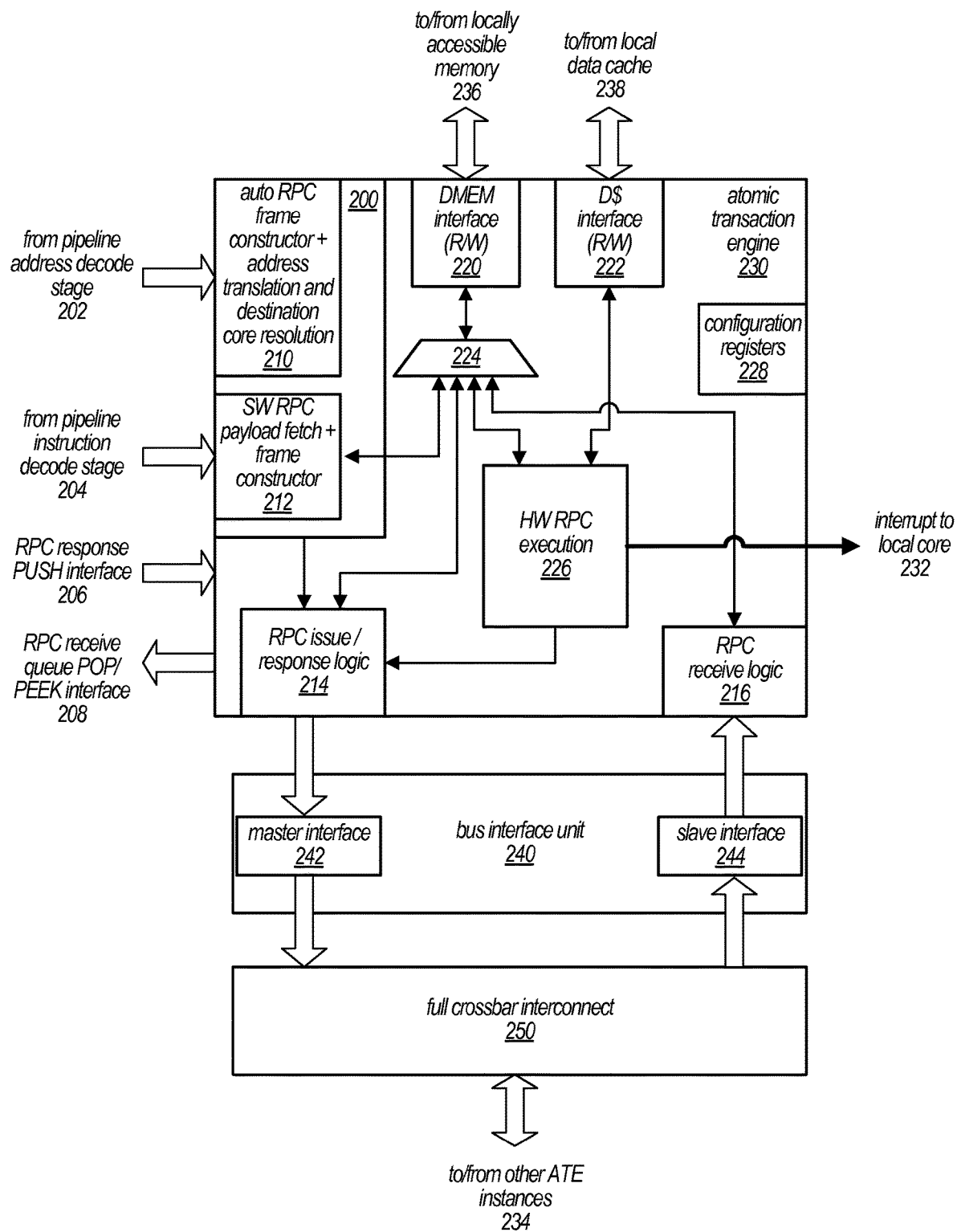
FIG. 2 is a block diagram illustrating one embodiment of an atomic transaction engine (ATE) instance, according to at least some embodiments.

One embodiment of an ATE instance is illustrated by the block diagram in FIG. 2. The atomic transaction engine (ATE) instance 230 illustrated in FIG. 2 may implement some or all of the functionality described herein for performing (or managing the performance of) atomic transactions on nearby data in a distributed shared memory system. The ATE instance 230 may include dedicated circuitry that is configured to implement at least some of this functionality on behalf of a given processor core. As illustrated in FIG. 2, frame constructor logic/circuitry 200 within ATE instance 230 may receive inputs from the processor's pipeline address decode stage (shown as 202) and/or from the processor's pipeline instruction decode stage (shown as 204). One sub-component of the frame constructor logic/circuitry 200 (shown as auto RPC frame constructor+address translation and destination core resolution block 210) may issue an RPC if the pipeline detects that it needs to perform a simple operation (e.g., a load, store, or increment operation) on a data item that is located in the shared memory. Note that, regardless of whether or not the target data item resides in a memory location that belongs to the local processor core, this operation may be managed through the ATE instance 230.

In some embodiments, if the pipeline detects that it needs to perform a simple operation on a data item that is located in the shared memory, the processor core may provide information about the operation to the ATE instance 230, including the address for the data item on which that operation is to be performed, and an identifier or other indication of the core that has control over the portion/region of the shared memory that includes that target address. In some cases (e.g., for more complicated operations), the processor core may also include information indicating an indexed load or other information specifying the number of elements to load, store, and/or return. The ATE instance 230 may then take that information, generate a descriptor, and populate the fields of the descriptor appropriately (e.g., based at least in part on the information received from the processor core), and then send the descriptor to the ATE instance associated with the processor core that has control over the portion/region of the shared memory that includes that target address. Note that if the portion/region of the shared memory that includes that target address is controlled by the local processor core, ATE instance 230 may, in effect, send the descriptor to itself. However, if the portion/region of the shared memory that includes that target address is not controlled by the local processor core, ATE instance 230 may send the descriptor (and any associated payload information) to an ATE instance associated the processor core that controls that portion/region of the shared memory within an RPC frame over a dedicated ATE network.

As illustrated in this example, another sub-component of the frame constructor logic/circuitry 200 (shown as SW RPC payload fetch+frame constructor 212) may be accessed when software executing on the local processor core issues an RPC with return/response (e.g., an RPCWR) or an RPC with no return/response (an RPCNR), e.g., when the software explicitly includes a remote procedure call. For example, in some embodiments, the processor core may support remote procedure calls with special RPCWR and RPCNR instructions. In this case, the logic/circuitry within sub-component 212 may assemble an RPC frame that includes a properly formed descriptor (as described herein) and any associated payload information (based, e.g., on information in the call made by the software and/or on other inputs to frame constructor logic/circuitry 200), and ATE instance 230 may send the descriptor to the ATE instance associated with the processor core that has control over the portion/region of the shared memory that includes that target address. As noted above, if the portion/region of the shared memory that includes that target address is controlled by the local processor core, ATE instance 230 may, in effect, send the descriptor to itself. However, if the portion/region of the shared memory that includes that target address is not controlled by the local processor core, ATE instance 230 may send the descriptor (and any associated payload information) to an ATE instance associated the processor core that controls that portion/region of the shared memory within an RPC frame over a dedicated ATE network.

As illustrated in this example, ATE instance 230 may include RPC issue/response logic 214, which may include a response queue and which is configured to manage traffic between ATE instance 230 and bus interface unit 240, e.g., when ATE instance 230 sends RPC frames to other ATE instances. In some cases, ATE instance 230 may issue an RPC frame to another ATE instance and (at approximately the same time) another portion of the ATE logic/circuitry may be processing an RPC frame that it received from an ATE instance associated with another processor core. For example, ATE instance 230 may be associated with a processor core 0. While trying to send an RPC request frame to an ATE instance associated with processor core 1, ATE 230 may be processing an RPC request frame that it previously received from the ATE instance associated with processor core 1. If a command specified in the previously received RPC frame requires a response to be sent back to core 1, the RPC response frame will follow the same path as the RPC request frame being sent from ATE 230 to the ATE instance associated with processor core 1. In other words, both the RPC request frame and the RPC response frame being sent from ATE 230 to the ATE instance associated with processor core 1 may go through RPC issue/response logic 214.

In some embodiments, RPC issue/response logic 214 may be configured to manage when the last piece of the data passes through RPC issue/response logic 214 and to keep the frame together. In some embodiments, RPC issue/response logic 214 may also be configured to perform some housekeeping functions on various RPC frames before passing them to bus interface unit 240. As illustrated in this example, both RPC request frames and RPC response frames that are sent from ATE instance 230 to other ATE instances are sent (though master interface 242 of bus interface unit 240) over full crossbar interconnect 250 (a private ATE interconnect), as shown at 234 in FIG. 2. As illustrated in FIG. 2, bus interface unit 240 may also include a slave interface 244 through which ATE request frames are received (over full crossbar interconnect 250) from ATE instances associated with other cores for processing by ATE instance 230. In addition, RPC response frames that are generated by other cores for RPC requests that were issued by ATE instance 230 may also be received though slave interface 244. The RPC request frames and RPC response frames that are received through slave interface 244 may be passed to RPC receive logic 216 within ATE instance 230. This RPC receive logic 216 may be configured to determine whether received RPC frames represent RPC requests or RPC responses, and to forward them to the appropriate sub-components of ATE instance 230. For example, when an RPC response frame is received, the response data may be written back to the location in the DMEM at which it needs to be written to be returned to the processor core (e.g., through multiplexor 224 and DMEM interface 220) so that the processor core can proceed. On the other hand, when an RPC request frame is received, the RPC receive logic 216 may place the RPC request frame in an RPC receive queue (not shown) for subsequent processing. For example, in some embodiments, there may be a small amount of storage within the local core's portion of the DMEM in which RPC request frames that are received from other processor cores (or their associated ATE instances) are buffered before being processed.

As illustrated in FIG. 2, ATE instance 230 may include a hardware RPC execution unit 226, which may be configured to perform the operations indicated in received RPC request frames. For example, in some embodiments, hardware RPC execution unit 226 may be configured to pull RPC request frames off of the RPC receive queue, and also starts decoding and processing them, and to determine how they should be processed. As described herein, the hardware RPC execution unit 226 may include logic/circuitry for performing various relatively simple operations (such as read, write, and increment operations, with and without returns) that target locally-controlled memory locations and the data items stored therein. If the hardware RPC execution unit 226 determines that it can process an RPC request frame on its own (performing the operations indicated in the RPC request frame), it may do so. For example, the hardware RPC execution unit 226 of ATE instance 230 may fetch the first word of the RPC frame, which may include the descriptor for the RPC frame. As described in more detail below, the descriptor may contain information indicating the type of RPC (e.g., the operation to be performed). By processing the descriptor, hardware RPC execution unit 226 of the ATE instance 230 may determine whether or not it can proceed on its own.

In some embodiments, if hardware RPC execution unit 226 does not support the operation(s) indicated in the descriptor of the RPC request frame and/or if hardware RPC execution unit 226 determines that processing the RPC request frame requires software intervention, it may raise an interrupt to the local processor core, which will subsequently process the RPC request frame. This output of ATE instance 230 is illustrated in FIG. 2 as 232. More specifically, in some embodiments, in response to such an interrupt, the processor core may access the contents of the RPC request frame by issuing POP and PEEK instructions (shown as input 208 to ATE instance 230). For example, the processor core may issue a POP instruction to pop an RPC request frame off of the receive queue of the ATE. On the other hand, if the processor core needs to return a response to the RPC request, it may use the PUSH interface (shown as input 206 to ATE instance 230) to send response data to ATE instance 230 (after which RPC issue/response logic 214 within the ATE instance 230 may form the appropriate response frame before sending it to the destination ATE instance, as described above).

In some embodiments, when the hardware RPC execution unit 226 of ATE instance 230 processes the descriptor of an RPC frame that is to be processed by the local processor core, it may also write control information that was extracted from the RPC request frame (e.g., from it descriptor) into its own configuration registers 228 (e.g., prior to interrupting the processor core), and the processor core may (in response to the interrupt) read those registers to determine what it needs to do to process that RPC. For example, the information in the configuration registers may indicate how many words the processor core needs to pop off of the receive queue to read the complete RPC request frame, may indicate whether the processor core needs to send a response back to the originator of the request, and (if so) may indicated how many words the processor core needs to send back in a corresponding RPC response frame. In some embodiments, while the processor core is processing the RPC request frame (e.g., while it performs one or more operations indicated in the RPC request frame), and as it generates response data by performing those operations, the processor core may use the RPC response PUSH interface to move the response data to the ATE instance 230 for subsequent inclusion in the RPC response frame.

As illustrated in FIG. 2, the logic/circuitry shown as the interface to the DMEM (220) manages read and write traffic between ATE instance 230 and the locally accessible portions of the DMEM (shown as 236). For example, this interface may be used to read from and write to portions of the distributed shared memory that are controlled by the local processor core and/or other memory locations that are accessible by the local processor core. Similarly, the logic/circuitry shown as the interface to the data cache (222) manages read and write traffic between ATE instance 230 and the data cache of the local processor core (shown as 238). In some embodiments, the data item(s) in the distributed shared memory that are to be operated on by ATE instance 230 or by the local processor core may be found in one of those two places. As noted above, in some embodiments the RPC receive queue may also reside in the DMEM (not shown). In such embodiments, all of the accesses to the RPC receive queue may be made through the DMEM interface 220. Note that placing the RPC receive queue in the DMEM (which may include a relatively large amount of local memory) may allow the software to configure the size of the RPC receive queue within that block of local memory based on the expected or workload. Allowing the ATE instance 230 to buffer up a large number of RPC frames may prevent the entire network being held up while the ATE instance 230 is processing RPC request frames. In some embodiments, the size of the RPC receive queue may be changed dynamically based on the workload. In other embodiments, software may allocate a particular amount of space for the RPC receive queue and may communicate this to the ATE instance 230, so that it knows how much memory it has to work with. Again note that, in some embodiments, the interface between the DMEM and the ATE instance 230 may include a relatively fast interconnect. For example, in some embodiments, there may be a direct connection between the ATE instance and the DMEM.

In one embodiment, the Atomic Transaction Engine configuration registers described above (which may also be referred to as control and status registers) may include one or more of the registers shown in Table 1 below. In other embodiments, more, fewer, or different control and status registers may be included in the Atomic Transaction Engine. Note that the ATE control and status registers may be arranged in any order (and may or may not be located contiguously in address space), in different embodiments.

TABLE 1

Example ATE Control and Status Registers

| Name | Description |
|------|-------------|
| RDR | RPC Descriptor Register: The values in this register may specify information about the RPC that software can use in executing the operation. Some examples of the information in this register are described below. |
| IR | Interrupt Register: The value in this register may be used to view and clear Interrupts caused by the ATE. |
| IER | Interrupt Enable Register: The value in this register may be used to enable or disable interrupts caused by the ATE. |

In some embodiments, the ATE control and status registers may also include fields for specifying the starting address in the DMEM for the ATE receive queue, for specifying the size of the receive queue (e.g., in words), and/or for specifying the number of words currently in the receive queue (e.g., one field may specify the number of words present in the receive queue, and another field may specify the number of words that have been pre-fetched from the receive queue), any or all of which may be configurable by software to control various ATE functions.

In some embodiments, the ATE may pre-fetch one or more words (e.g., a maximum of two words, in one embodiment) from the receive queue at any given time. In some embodiments, the total number of buffered RPC words may be calculated as the number of words in the receive queue plus the number of words that have been pre-fetched from the receive queue. In some embodiments, the size of the Short RPC Receive buffer may be assumed to be 8 words, which is the maximum size of an RPC response frame.

In at least some embodiments, when software creates a descriptor for use with RPC instructions with no return (RPCNR) and RPC instructions with return (RPCWR), it may populate various fields of the descriptor to specify an RPC type identifier (sometimes referred to herein as the RPCID), a source core identifier (SRCID), a destination core identifier (or DESTID), the length of the payload (e.g., in words), and/or the length of the return payload (e.g., words), as applicable. In some embodiments, hardware may populate the SRCID field (e.g., automatically).

In some embodiments, particular RPCID values (e.g., values 0-15, in one embodiment) may be reserved for RPCs that are implemented in hardware and that do not require software support. As described above, it may be possible for a processor core to send an RPC to itself (e.g., the DESTID field may indicate the local processor core). In fact, in some embodiments, when operating on shared data (e.g., any location within the distributed shared memory), software must use the RPC mechanism described above to perform the operation (rather than direct loads and stores) in order to avoid coherence issues.

In various embodiments, the Interrupt Register may include fields representing one or more of the following: an interrupt that occurs when the ATE pulls an RPC frame from the ATE receive queue that needs to be serviced by software, an interrupt that occurs when both the ATE receive queue and the prefetch buffer become full, or an interrupt that occurs when both the ATE receive queue and the prefetch buffer become empty. In some embodiments, these interrupts may be cleared by writing to these fields.

The Interrupt Enable Register may include fields representing one or more of the following: a bit for enabling an interrupt that occurs when the ATE pulls an RPC frame from the ATE receive queue that needs to be serviced by software, a bit for enabling an interrupt that occurs when both the ATE receive queue and the prefetch buffer become full, or a bit for enabling an interrupt that occurs when both the ATE receive queue and the prefetch buffer become empty. In some embodiments, the corresponding interrupt may be enabled when one of these bits is set and may be masked when it is cleared.

In some embodiments, when software writes the field in the Interrupt Register representing an interrupt that occurs when the ATE pulls no RPC frame from the ATE receive queue that needs to be serviced by software, the hardware may examine the next word in the Receive Queue as an RPC descriptor. If this descriptor is a software-based RPC, then this bit may be set in the following cycle, and may need to be explicitly cleared by software upon being handled. If the interrupt is masked, software may need to poll this bit to determine whether a software RPC is available. In this example, software may write a 1 to this field in the Interrupt Register to clear the interrupt. In this example, when software writes the field representing an interrupt that occurs when both the ATE receive queue and the prefetch buffer become full, the hardware may examine the Receive Queue status again. If the queue is still full, this interrupt may be set again in the following cycle. In some embodiments, software may write a 1 to this field to clear the interrupt. In this example, when software writes the field representing an interrupt that occurs when both the ATE receive queue and the prefetch buffer become empty, the hardware may examine the Receive Queue status again. If the queue is still empty, this interrupt may be set again in the following cycle. In some embodiments, software may write a 1 to this field to clear the interrupt.

In one example embodiment, from the point of view of each processor core (e.g., each general-purpose or special-purpose processor core), the data space may be broken up into three high level regions:

A region that is cacheable main system memory space

A region that is a core-specific private space

A region that corresponds to external peripheral space

In this example, the core-specific private space may be unique per processor core. It may not be externally visible, nor accessible by components other than its respective processor core and a corresponding ATE instance.

As noted above, the ATE instances associated with each processor core may serve as a gateway for all shared memory accesses in the system. In various embodiments, it may receive RPC transmission requests from its local core, construct the corresponding RPC frames and send them over to various remote cores (or back to the local core) for processing. As described herein, access to shared memory regions may be made by a core either in the form of an explicit RPC instruction execution or implicitly by the core pipeline based on software configurable shared address decode logic/circuitry, in some embodiments. For example, in some embodiments, an RPC may be issued automatically by the local core once its address decode stage determines that the operand is a shared memory location. In some embodiments, these automatically-issued RPC operations may be limited to relatively simple instructions such as LOAD, STORE, ADD, INC, and Compare-and-Swap. In some embodiments, the ATE instances may provide a small instruction set that can be used by the software to describe the structure of an RPC frame and its identifier (e.g., its RPCID) so that the ATE hardware can identify and execute that RPC itself (rather than raising an RPC interrupt to the local processor core and asking it to execute the RPC in software). This may result in lower overall latency in the system, in some embodiments.

In some embodiments, the RPCs may also be issued explicitly under software control by using one of the processor core's RPC instructions. The type of operations in these RPC may range from simple reads or writes to message passing, in different embodiments. Before issuing an explicit RPC instruction, the software may assemble the RPC payload in its local DMEM or General/Special Purpose Registers, and then may pass a pointer to this location along with other control information to the local ATE instance as part of the RPC instruction. The RPC instruction may include a descriptor that contains control information such as the RPCID or operation identifier, the number of words being sent and/or the number of words that are expected back in a response frame, and the destination core, as well as a pointer to the RPC frame payload constructed earlier. The local ATE instance may then assemble the actual RPC frame by fetching the payload data from the DMEM and may send this frame over the private ATE interconnect network.

As previously noted, an RPC requested by a processor core may or may not expect data to be returned by the remote processor core that performs the requested operation (e.g., it may be an RPCWR or an RPCNR). For example, a processor core may issue an RPCNR to tell another processor core to perform some operation for which the requesting core does not need (or expect) a return value. Such an operation may be used, for example, to create a check-in point, where one of the processor cores in the system acts as a master core and the other cores (e.g., acting as slave cores) may check in periodically with that core. In this example, every slave core, when it gets to a certain point, may issue an RPC to the master core indicating that it has reached the check-in point. This RPC may perform a simple operation such as writing to a particular address location, or incrementing the value of an address location by 1 to indicate how many of the cores have reached the synchronization point. In this example, after sending this RPC to the master core, the slave core may wait at that point (since it has already reached the synchronization point). When all of the slave cores have checked in, the master core may send out another RCPNR (to all of the slave cores) to indicate that the slave cores should resume execution or to initiate the execution of a new set of operations, for example.

In some embodiments, a processor core may issue an RPCWR to tell another processor core to perform some operation on shared data when the requesting processor core needs (or expects to receive) one or more return values. In one example, the requesting core may want to perform a read of a memory location that another core control. In this case, the requesting core may issue an RPCWR to the other core, which will read the memory location and send the data that was read back to the requesting core in a response RPC frame. In another example, an RPCWR may be used create semaphores. In this example, if one core wants access to a shared resource, it may issue an RPCWR that specifies a compare-and-swap (CAS) type operation to the remote core that controls a shared memory location (a semaphore location) indicating whether the shared resource is available. As described herein, the ATE instance may include circuitry to perform such a CAS instruction in hardware. In this example, the core may send a particular value (e.g., a value of 1) to the remote core that controls the shared memory location indicating whether the shared resource is available. If the value of the semaphore location indicates that the shared resource is available, the remote core may return a certain value back (e.g., a value of 0 or some other value indicating that the shared resource is available). If the remote core does return the value indicating that the shared resource is available, the requesting core may proceed. In this example, since the CAS instruction was used to update the shared memory location controlled by the remote core, any other core that wants to access the shared resource will have to wait (e.g., because the semaphore location has a value indicating that the resource is not currently available, i.e., that it is being used).

In some embodiments, if the requesting processor expects a return (e.g., if the RPC is an RPCWR), the ATE instance associated with the requesting processor may also capture the RPC response frame coming back from the remote processor core and deliver it either directly to the local core's pipeline (e.g., if it is stalled waiting for this data) or may move the response data to the location in local DMEM that was specified by the core when it issued the RPC.

In some embodiments, if a processor core issues an RPC with return, it may stall at that point waiting for the response. However, other embodiments may utilize a "wait for event" construct to avoid stalling at that point. In such embodiments, after issuing an RPC transaction, if the requesting core needs to wait for the response, there may be a finite amount of time between the issuing of the RPC and receiving a response back (e.g., the time it takes for the RPC to be sent by the local ATE instance to another ATE instance over the ATE network, for the remote ATE instance or remote core to perform the operation indicated in the RPC, and for the remote ATE instance to return the response to the local ATE instance). In some embodiments, rather than waiting for all of this to take place, the requesting core may execute one or more other instructions while this takes place (e.g., instructions that do not depend on the response data). At some point later (e.g., at a point where the requesting core needs the response), the requesting core may issue a "wait for event" instruction (e.g., in the software executing on the requesting core), and may specify an event ID that is associated with the local or remote ATE instance. In this example, once that "wait for event" instruction has been issued, it may create a barrier point past which core will not proceed until the waited-for event has occurred. In some embodiments, the waited-for event may be that the remote ATE has returned the response data for the previous RPCWR or that the local ATE has written the response data back to the location that was pointed to by the requesting core when it issued the RPC.

Figure 3:
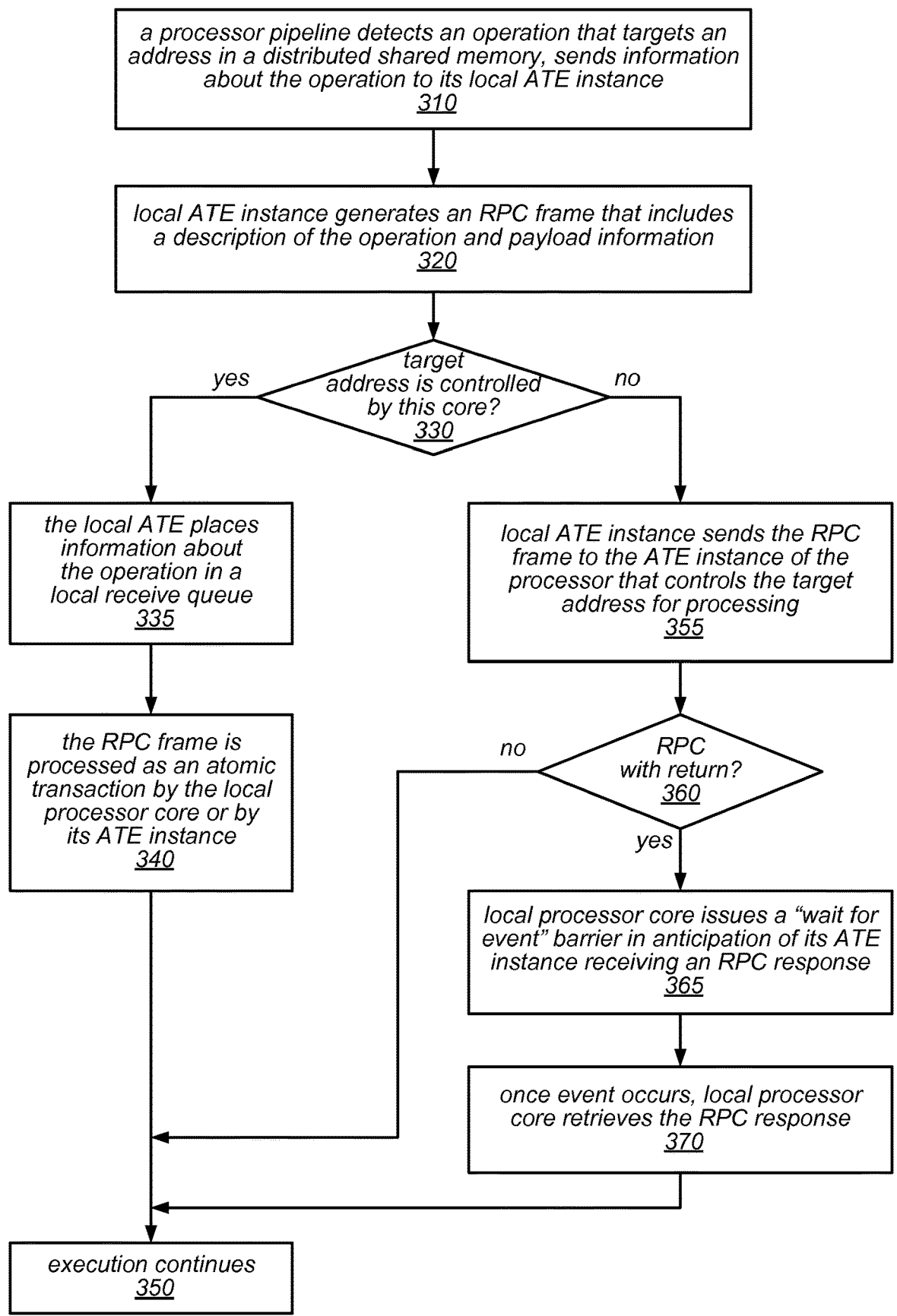
FIG. 3 is a flow diagram illustrating one embodiment of a method for generating and handling an RPC frame.

One embodiment of a method for generating and handling an RPC frame is illustrated by the flow diagram in FIG. 3. As illustrated at 310, in this example, the method may include a processor pipeline detecting an operation that targets an address in a distributed shared memory, and sending information about the operation to its local ATE instance. The method may include the local ATE instance generating an RPC frame that includes a description of the operation and (if applicable) payload information, as in 320. Note that, depending on the operation, the RPC frame may specify an RPC with return or and RPC without return.

As illustrated in this example, if the target address is controlled by this core (shown as the positive exit from 330), the method may include the local ATE instance placing information about the operation in a local receive queue, as in 335. The method may also include the local processor core (or its ATE instance) processing the RPC frame as an atomic transaction (as in 340), after which execution of the application that included the operation continues (as in 350). On the other hand, if the target address is not controlled by this core (shown as the negative exit from 330), the method may include the local ATE instance sending the RPC frame to the ATE instance of the processor that controls the target address for processing, as in 355.

As described herein, the RPC frame may be sent from the local ATE instance to the other ATE instance over a dedicated ATE interconnect, in some embodiments. If the RPC frame is for an RPC with return (shown as the positive exit from 360), the method may include the local processor core issuing a "wait for event" barrier in anticipation of its ATE instance receiving an RPC response, as in 365. Note, however, that the local processor core may perform one or more operations between the time that RPC frame is sent to the other ATE instance and the time at which it issues a "wait for event" barrier if it has other work to do that does not depend on the response. As illustrated in this example, once the waited-for event occurs, the method may include the local processor core retrieving the RPC response (as in 370), after which execution of the application that included the operation continues (as in 350). Note that, as illustrated in FIG. 3, if the RPC frame is for an RPC with no return (shown as the negative exit from 360), there may be no need to wait for a response before execution continues at 350.

Figure 4A:
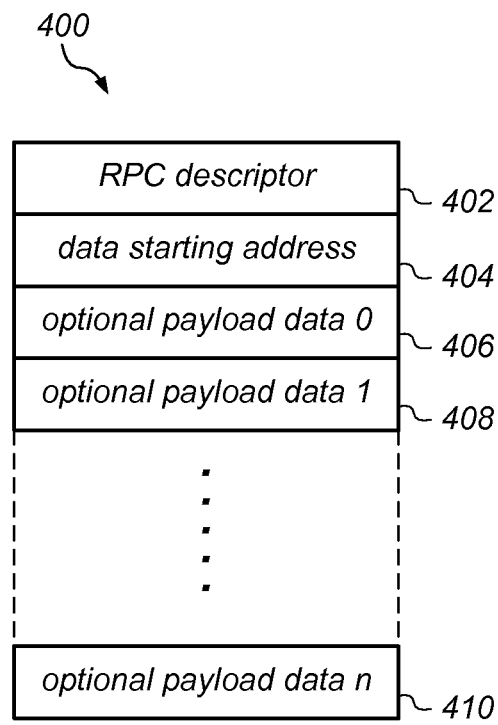
FIGS. 4A and 4B are block diagrams illustrating example RPC frame structures, according to at least some embodiments.
Figure 4B:
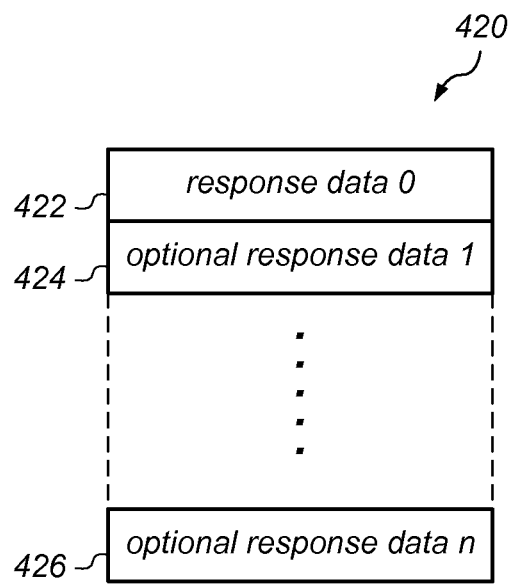

FIGS. 4A and 4B illustrate example RPC frame structures, according to at least some embodiments. More specifically, FIG. 4A illustrates an example RPC request frame 400 and FIG. 4B illustrates an example RPC response frame 450. In these examples, request frame 400 includes an RPC descriptor 402 (which may include any or all of the example descriptor information described herein and/or other information) and a data starting address 404 (which may identify the starting address of the target(s) of the operation), and may (optionally) also include one or more payload data elements (shown as 404-410). Note that, in some cases, one or more of the payload data elements may represent addresses. In these examples, response frame 420 includes at least one response data element, shown as 422, and may (optionally) include one or more additional response data elements (shown as 424-426).

As previously noted, some of the RPCs that can directly be processed by an ATE instance itself may be hardcoded (e.g., implemented in dedicated circuitry within the ATE instance) while the others may be programmed by the local processor core using a set of configuration registers and a small instruction set provided by the ATE instance. In some embodiments, this may make it possible to implement relatively simple software routines such that they are handled completely by the local ATE instance without the need to interrupt the core. This may, in turn, reduce the overall latency of the system as well as increase the overall system throughput (e.g., MIPS). In one example embodiment, the RPC commands that may be implemented in hardware in an ATE instance may include those illustrated in Table 2 below. In other embodiments, more, fewer, or different RPC commands may be implemented in hardware in an ATE instance.

TABLE 2

Example Hardware-Implemented ATE RPC Commands

| Command | RPCID | Description |
| --- | --- | --- |
| DataRead | 0 | Read data from specified memory address |
| DataWrite | 1 | Write data from specified memory address |
| AtomicAdd | 2 | Add value to memory |
| AtomicAddRtn | 3 | Add value to memory, with return |
| CmpAndSwap | 4 | Atomic compare and swap |

Note that the target addresses for these operations may be in data cache or in data memory (DMEM). In some embodiments, the addresses sent as part of an RPC may be padded with zeros to form an appropriately-sized address irrespective of whether they lie in data cache or data memory space. Some of these commands may return data to the RPC initiator (the processor core that issued the RPC command). Those response data values may be written into the payload area of the corresponding RPC response frame, beginning with the first word of the payload area. The example commands listed above are described in more detail below, according to at least some embodiments.

In this example, the DataRead command (RPCID=0) may be used to read data from memory and return one or more data words. In some embodiments, a DataRead type RPC may be sent either as an RPCWR or as the shorter RPCWRS. The payload (i.e., the operands) for this command may include one or more words that specify the target address, respectively. The return payload for this command may include the number of words specified in its descriptor. For example, the return payload may include 1-8 words for RPCWR and 1-6 words for the shorter RPCWRS, in one embodiment. Note that the ATE may automatically increment the memory address after each access, where the amount by which the address is incremented is dependent on the size of the payload.

In this example, the DataWrite command (RPCID=1) may be used to perform a sequential data memory write. In some embodiments, a DataWrite type RPC may be sent either as an RPCNR or as the shorter RPCNRS. The payload (i.e., the operands) for this command may include one or more words specifying the target address, and one or more additional words (containing data to be written) up to the number of words specified in its descriptor. For example, the payload may include 3-8 words for an RPCNR command that writes 1-6 data items, or 3-6 words for the shorter RPCNRS command that writes 1-4 data items, in one embodiment. Since there is no return value for this command, the descriptor may indicate that that return payload length is 0. Note that the ATE may automatically increment the memory address after each access, where the amount by which the address is incremented is dependent on the size of the payload.

In this example, the AtomicAdd command (RPCID=2) may be used to change a value in the distributed shared memory (e.g., DMEM) or data cache (D$) using an atomic add or subtraction operation. In other words, this command may be used to read a data value from a target memory location, add a 32-bit value to the contents that were read, and write the resulting value back to the same memory location. Up to six such modified values may be written to memory using this command, in some embodiments. In some embodiments, an AtomicAdd type RPC may be sent either as an RPCNR or as the shorter RPCNRS. The payload (i.e., the operands) for this command may include one or more words specifying the target address, and one or more additional words (containing data to be written) up to the number of words specified in its descriptor. For example, the payload may include 3-8 words for an RPCNR command that writes 1-6 data items, or 3-6 words for the shorter RPCNRS command that writes 1-4 data items, in one embodiment. Since there is no return value for this command, the descriptor may indicate that the return payload length is 0. Note that the ATE may automatically increment the memory address after each access, where the amount by which the address is incremented is dependent on the size of the payload.

In this example, the AtomicAddRtn command (RPCID=3) may be used to change a value in the distributed shared memory (e.g., DMEM) or data cache (D$) using an atomic add or subtraction operation. In other words, this command may be used to read a data value from a target memory location, add a 32-bit value to the contents that were read, and write the resulting value back to the same memory location. In some embodiments, the payload may include up to six add values, and the first return value may be written to the same address as the first word of the payload. In some embodiments, an AtomicAddRtn type RPC may be sent either as an RPCWR or as the shorter RPCWRS. The payload (i.e., the operands) for this command may include one or more words specifying the target address, and one or more additional words (containing data to be written) up to the number of words specified in its descriptor. For example, the payload may include 3-8 words for an RPCNR command that writes 1-6 data items, or 3-6 words for the shorter RPCNRS command that writes 1-4 data items, in one embodiment. In some embodiments, the return payload length may be equal to the number of add result values returned, which is also the number of add values in the payload. In such embodiments, the descriptor may indicate that the return payload has two fewer elements than the payload. Note that the ATE may automatically increment the memory address after each access, where the amount by which the address is incremented is dependent on the size of the payload.

In this example, the CmpAndSwap command (RPCID=4) may be used to compare a memory value to a payload value and then, based on a comparison of the memory value to the specified compare value, perform a swap operation. The entire operation may be considered atomic. For example, the CmpAndSwap command may be used to perform an operation similar to that illustrated by the following pseudo-code:

```
const int *mem_ptr = MemoryAddress;
int temp;
if (*mem_ptr == CompareValue) {
    temp = *mem_ptr;
    *mem_ptr = SwapValue;
    return temp;
}
else return *mem_ptr;
```

In some embodiments, a CmpAndSwp type RPC may be sent either as an RPCWR or as the shorter RPCWRS. The payload (i.e., the operands) for this command may include one or more words specifying the target address, followed by one or more compare and swap value pairs (each of which takes up one word for the compare value and one word for the swap value). For example, payload may include four words if only a single compare and swap value pair is included in the payload, but may include eight words if three compare and swap value pairs are included in the payload. In this example, payload may include 4, 6, or 8 words for RPCWR commands that perform 1, 2, or 3 compare and swap operations, or may include 4 or 6 words for the shorter RPCWRS command that performs 1 or 2 compare and swap operations. In this example, the return payload length may be equal to the number of compare and swap value pairs (e.g., 1, 2, or 3 for RPCWR commands and 1 or 2 for the shorter RPCWRS commands). Note that the ATE may automatically increment the memory address after each compare and swap operation, where the amount by which the address is incremented is dependent on the size of the payload.

In different embodiments, there may be different ways to determine whether (or when) to issue an RPC frame to perform an atomic transaction, some of which are implemented primarily in hardware, and others of which may be implemented by (or in conjunction with) software executing on a given node. One embodiment of a method for using software to determine whether or not to send an RPC frame to an ATE instance is illustrated by the flow diagram in FIG. 5. As illustrated at 510, in this example, the method may include software that is executing on a given processor core in a distributed computing system encountering an operation that targets an address in memory. If the software determines that the target address is an address of a location in a distributed shared memory (shown as the positive exit from 520), the method may include the software forming a descriptor and (optionally) payload data for a corresponding RPC that targets the shared memory, as in 530. In this case, the method may also include the software making an explicit RPC call (with or without return) that includes the descriptor and (if applicable) a pointer to the payload data in memory, as in 540.

On the other hand, if the software determines that the target address is not an address of a location in a distributed shared memory (shown as the negative exit from 520), the method may include the software executing the operation on the given processor core, as in 525. In either case, the method may include the software continuing execution on the given processor core (e.g., following execution of the operation by the processor core or while the ATE handles the RPC), as in 550. As illustrated by the feedback from the positive exit of 560 to 520, in this example, if and when another operation targets an address in memory (shown as the positive exit from 560), the method may include repeating the operations illustrated in 520-550 for each additional such operation.

Figure 5:
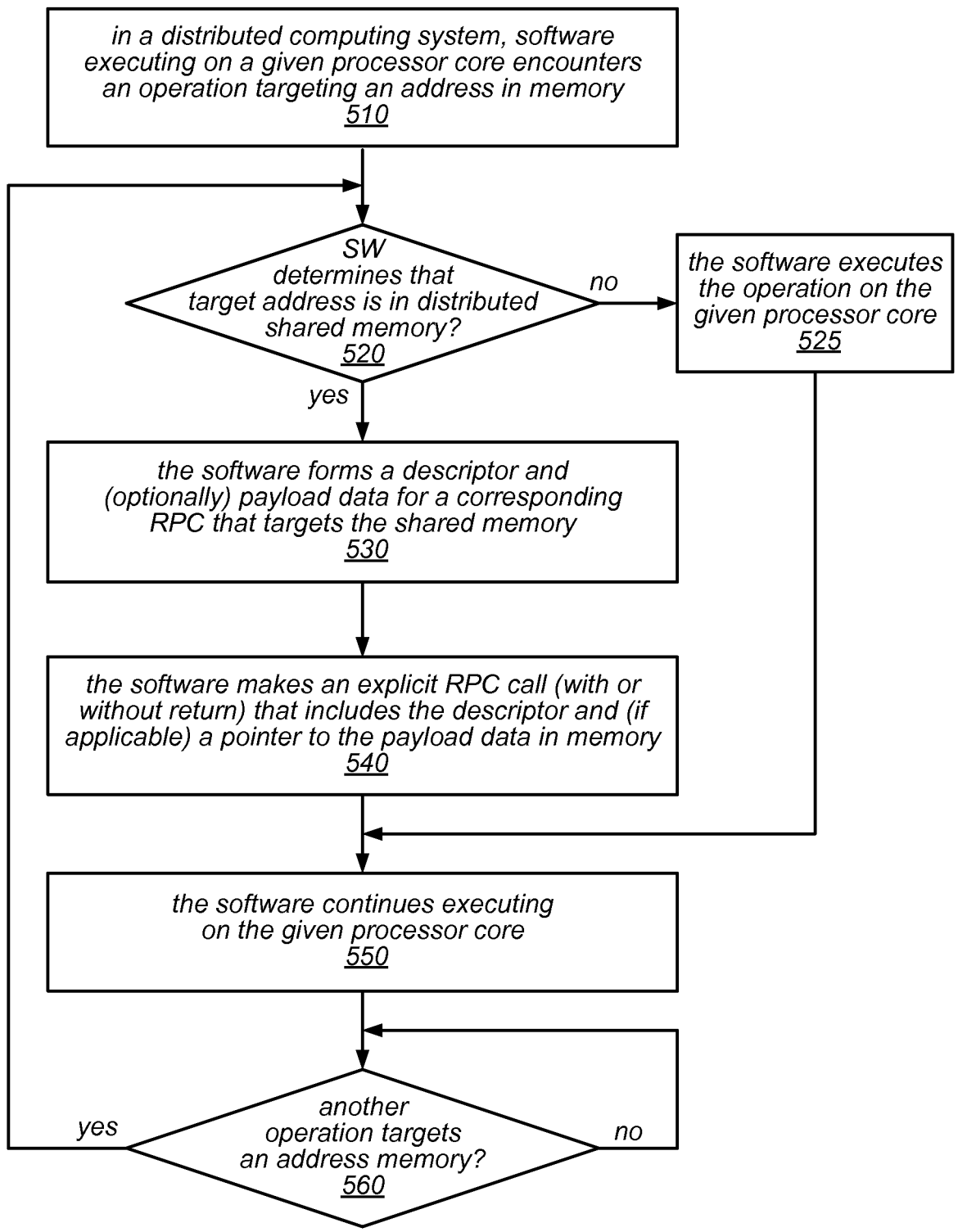
FIG. 5 is a flow diagram illustrating one embodiment of a method for using software to determine whether or not to send an RPC frame to an ATE instance.

As illustrated in FIG. 5 and described above, in some embodiments, software executing on a given processing core may be able to determine whether or not it should make an RPC call to perform an operation on data in a shared memory location. In other embodiments, such a determination may be made (or supported) using dedicated hardware within the processor core. For example, in some embodiments, a translation table structure may be built within shared region decoder logic/circuitry in the processor core, and the pipeline logic/circuitry may be able to determine whether an instruction is a shared region transaction. If so, rather than promoting the instruction in the pipeline, it may be handed over to the local ATE instance for handling. In other words, in some embodiments, an address decode table may be built inside each processor core (e.g., within the address decode stage) that determines whether or not an operation (e.g., a load or store) targets the distributed shared memory. If it does, the pipeline may automatically initiate an ATE transaction by supplying various control parameters to the local ATE instance for a corresponding RPC frame, and the local ATE instance may send that to a remote ATE instance (or to itself) for processing. Regardless of whether software or hardware are used to determine whether to issue an RPC, processing the RPC using a network of ATE instances may greatly reduce the software intervention required, at least for some of the simpler operations of an executing application.

Figure 6:
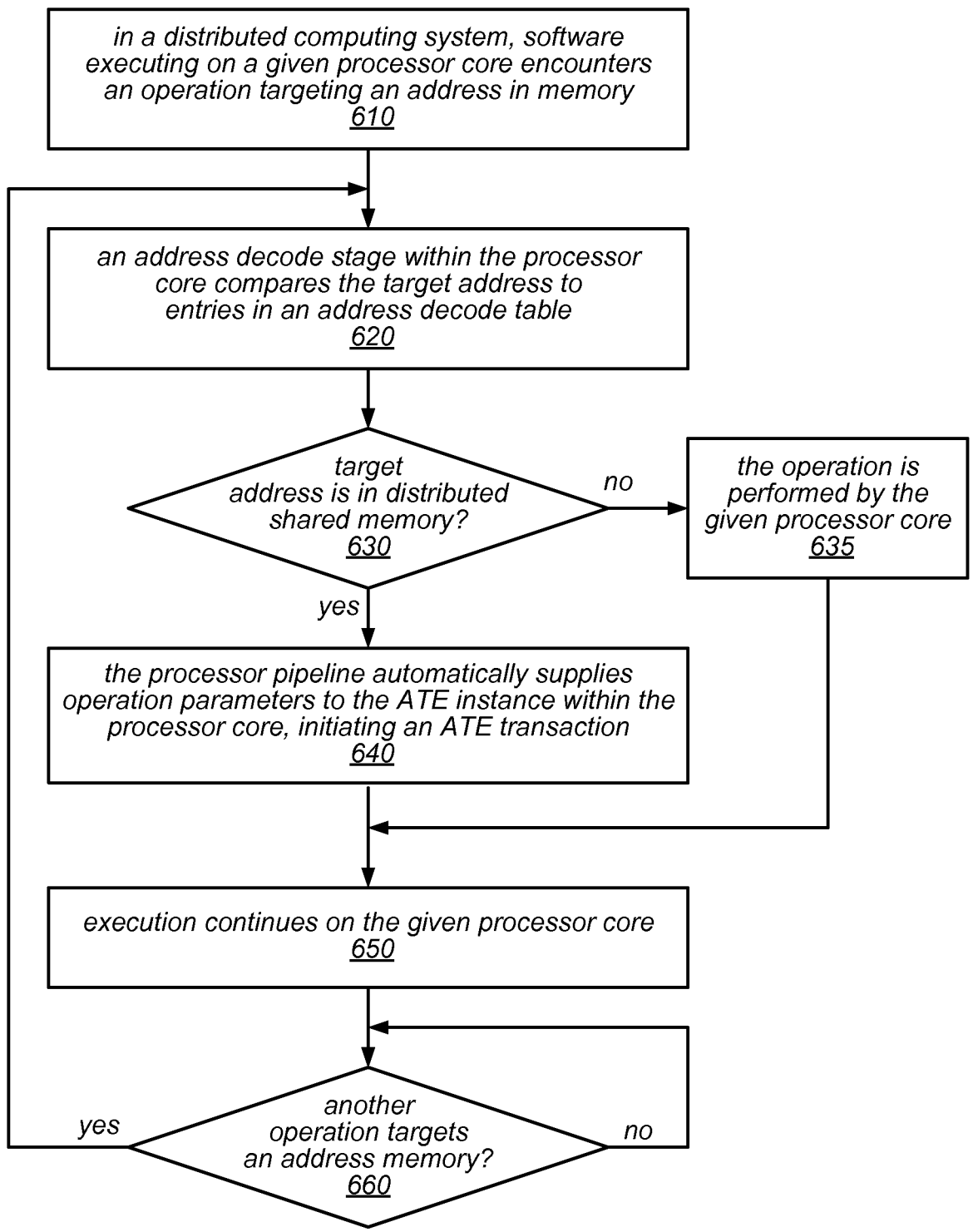
FIG. 6 is a flow diagram illustrating one embodiment of a method for using hardware to determine whether or not to send an RPC frame to an ATE instance.

One embodiment of a method for using hardware to determine whether or not to send an RPC frame to an ATE instance is illustrated by the flow diagram in FIG. 6. As illustrated at 610, in this example, the method may include software executing on a given processor core in a distributed computing system encountering an operation that targets an address in memory. The method may include an address decode stage within the processor core comparing the target address to entries in an address decode table, as in 620. If the target address is an address of a location in a distributed shared memory (shown as the positive exit from 630), the method may include the processor pipeline automatically supplying operation parameters to the ATE instance within the processor core, initiating an ATE transaction, in 640.

On the other hand, if the target address is not the address of a location in the distributed shared memory (shown as the negative exit from 630), the method may include the given processor core performing the operation, as in 635. In either case, the method may include continuing execution on the given processor core (e.g., following execution of the operation by the processor core or while the ATE handles the RPC), as in 650. As illustrated by the feedback from the positive exit of 660 to 620, in this example, if and when another operation targets an address in memory (shown as the positive exit from 660), the method may include repeating the operations illustrated in 620-650 for each additional such operation.

As previously noted, in addition to sending RPC frames to other ATE instances, each ATE instance may also service RPC frames issued by the other cores that want to access the shared memory space managed by that particular ATE instance. In some embodiments, these RPCs may be received via the interconnect slave interface of the ATE instance and may be queued up for processing in a receive buffer (e.g., one that is located in the ATE's own internal buffer space or in a hardware managed FIFO formed inside the DMEM as specified by the software by writing to the ATE's configuration registers). The ATE instance may subsequently pop RPC frames off this receive queue for processing (e.g., in the order that they were received, or according to some other priority policy or scheme). As illustrated in FIG. 4A and described herein, each RPC request frame may include a descriptor header followed by the target memory location address and any optional payload words. This descriptor may contains information about the RPCID, the size of the payload data, the amount of data to be returned (if any), etc. As described herein, the ATE may use the RPCID information in the descriptor to determine whether it can process and send a response (if requested) to a received RPC on its own or whether it needs to stall and interrupt the local processor core to handle the RPC.

In some embodiments, the ATE instance may monitor the its receive queue (which is sometimes referred to herein as the "ATE receive queue" or the "RPC receive queue"), and when an RCP appears at the top of the queue, it may be immediately pulled from the queue and processed (e.g., executed). In some embodiments, the ATE instance may determine, based on the RPCID, whether it is an RPC that can be executed by hardware within the ATE instance or whether the software executing on the processor core must execute the RPC. For example, in one embodiment, RPCIDs in the range 0-15 may be reserved for operations that are performed in hardware. If the operation is such a hardware based RPC, then it may executed by the ATE instance, which may return any response data to the requesting core's ATE instance (as needed).

In this example, if the RPC is not a hardware RPC (e.g., if its RPCID>15) then the ATE may signals an interrupt to the local processor core. The interrupt service routine for the processor core may read the RPC descriptor register and, based on the value of the RPCID, may invoke the appropriate interrupt handler. As mentioned previously, software may be able to pass operands with the RPC. These operands may be accessed by software on the receiving processor side by using PEEK and POP instructions to the ATE receive queue. However, software may need to take care not to pop more data from the queue than was actually sent. As noted above, a value in the RPC descriptor register may indicate the size of the payload.

In at least some embodiments, if the RPC requires data to be returned (e.g., if the RPC is an RCPWR), then software may generate this response data and pass it to the hardware using a PUSH instruction to an ATE response queue within the RPC issue/response logic. Here again, software may need to take care not to push more than the maximum amount of data that is allowed to be returned. For example, once the number of words pushed into the ATE receive queue matches the return payload length value specified in the descriptor, the ATE instance may generate a response back to the originating processor core. In some embodiments, e.g., for optimal performance, software may check for and execute any other software-based RPCs before exiting the RPC software interrupt service routine. In such embodiments, software may exit the RPC software interrupt service routine when a hardware-based RPC is present or when the queue is empty.

In some embodiments, if the core was interrupted to process the RPC, it may notify the ATE instance that it is finished processing the RPC by clearing the RPC interrupt status register. The ATE instance may then send the response data over to the requesting core in the form of an RPC response frame (such as that illustrated in FIG. 4B).

Figure 7:
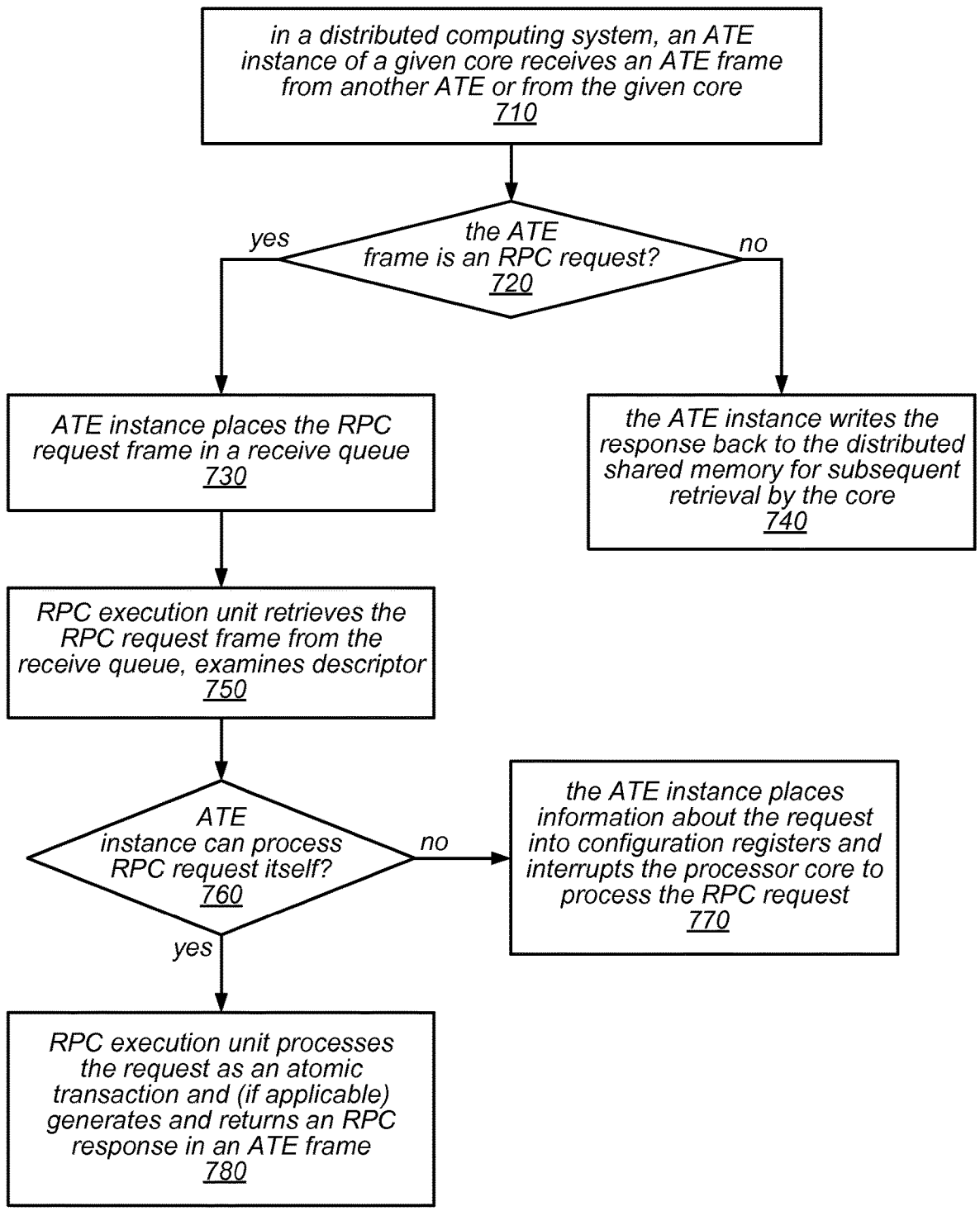
FIG. 7 is a flow diagram illustrating one embodiment of a method for handling an RPC frame that is received by an ATE instance.

One embodiment of a method for handling an RPC frame that is received by an ATE instance is illustrated by the flow diagram in FIG. 7. As illustrated at 710, in this example, the method may include an ATE instance of a given core in a distributed computing system receiving an ATE frame from another ATE instance or from the given core itself. If the ATE frame is an RPC request frame, shown as the positive exit from 720, the method may include the ATE instance placing the RPC request frame in a receive queue, as in 730. At some point later, the method may include an RPC execution unit of the ATE instance retrieving the RPC request frame from the receive queue, and examining its descriptor (or a portion of its descriptor, such as the first word), as in 750.

If the ATE instance determines (based on the examined descriptor, or portion thereof) that it can process the RPC request itself (shown as the positive exit from 760), the method may include the RPC execution unit processing the request as an atomic transaction and (if applicable) generating and returning an RPC response in an ATE frame, as in 780. However, if the ATE instance determines (based on the examined descriptor, or portion thereof) that it cannot process the RPC request itself (shown as the negative exit from 760), the method may include the ATE instance placing information about the request into one or more configuration registers within the ATE instance and issuing an interrupt to the processor core to process the RPC request, as in 770. One embodiment of a method for handling such an interrupt is illustrated by the flow diagram in FIG. 8. In this example, if the ATE frame is not an RPC request (e.g., if it is an RPC response frame that is received from another ATE instance to which an RPC request frame was previously sent), the method may include the ATE instance writing the response back to the distributed shared memory for subsequent retrieval by the processor core. This is illustrated in FIG. 7 by the negative exit of 720 and element 740.

Figure 8:
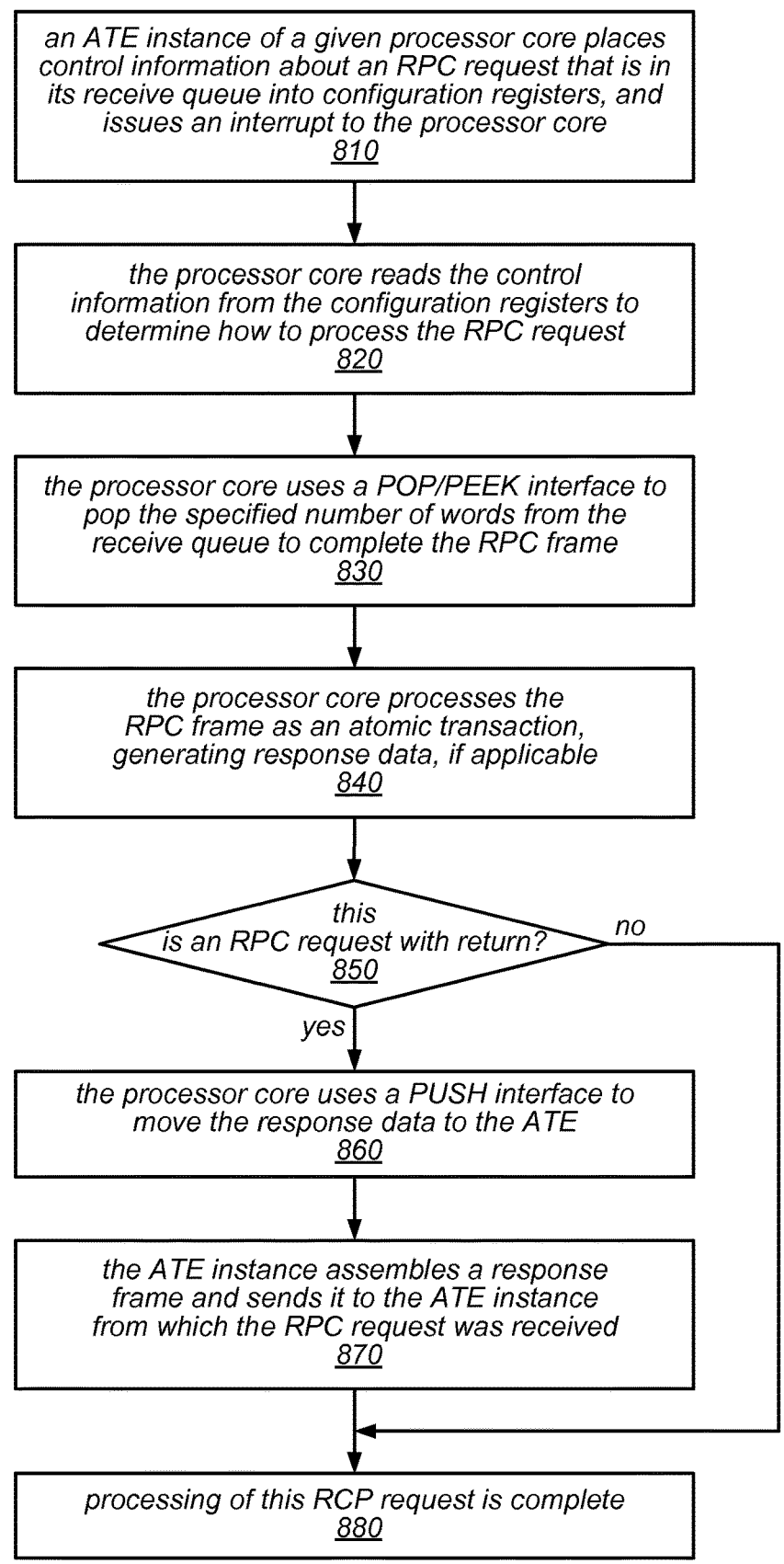
FIG. 8 is a flow diagram illustrating one embodiment of a method for handling an interrupt for a received RPC request frame.

One embodiment of a method for handling an interrupt for a received RPC request frame is illustrated by the flow diagram in FIG. 8. As illustrated at 810, in this example, the method may include an ATE instance of a given processor core placing control information about an RPC request that is in its receive queue into various configuration registers, and issuing an interrupt to the given processor core. At some point later, the method may include the processor core reading the control information from the configuration registers to determine how to process the RPC request, as in 820. For example, the control information may specify the type of operation, the number of words to be read from the RPC frame in the receive queue, the number of words to be included in the response (if applicable), and/or other information, in different embodiments. The method may also include the processor core using a POP/PEEK interface to pop the specified number of words from the receive queue to complete the RPC frame (as in 830), and the processor core processing the RPC frame as an atomic transaction, generating response data, if applicable (as in 840).

As illustrated in this example, if the RPC request is an RPC request with no return (shown as the negative exit from 850), the processing of this RCP request may be complete, as in 880. However, if the RPC request is an RPC request with return (shown as the positive exit from 850), the method may include the processor core using a PUSH interface to move the response data to the ATE instance, as in 860. In this case, the method may also include the ATE instance assembling a response frame and sending it to the ATE instance from which the RPC request was received, as in 870, after which the processing of this RCP request may be complete, as in 880.

In some embodiments, it may be possible to issue a broadcast RPC operation or a multicast RPC operation so that the same message or operation request can be sent to multiple processor cores simultaneously (e.g., for synchronization purposes, as a semaphore, or to initiate the start of a routine on multiple processor cores), after which they may be processed by each of the recipients substantially in parallel. While there may not be any guarantee that all of the receiving ATE instances will see and process these RPCs at exactly the same time, in at least some embodiments it may be guaranteed that all of them will eventually see and process the RPC. In one example, a core issuing a single RPC may configure the RPC request so that once it reaches the local ATE instance, the ATE instance can issue a corresponding RPC frame to each of the processor cores in the system or to a subset of the processor cores in the system. Using this approach, instead of the software executing on the processor core having to issue multiple individual RPCs, the local ATE instance can automatically handle sending a broadcast or multicast operation, which may reduce the overhead incurred by the processor core.

In some embodiments, a broadcast RPC that is issued by a processor core may include broadcast indicator that is interpreted by the local ATE instance. When such a request is issued by the processor core, the ATE instance will issue the same RPC to all of the processor cores in the system. In some embodiments, a multicast RPC that is issued by a processor core may include an indication that the RPC should be multicast and an identifier of the processor cores to which the RPC should be sent. For example, the request may include a bit vector, a pointer to a list of recipient processor cores, or some other indicator of the target recipients, and the local ATE instance may interpret that information and send the RPC to the processor cores specified as recipients for the request. In embodiments in which the recipient cores are identified using a bit vector, the local ATE instance may examine the bit vector to determine which cores should receive the RPC, and may send the RPC to each one (e.g., one at a time) as it works through the bit vector. In other embodiments, the ATE instance may first determine all of the recipient processor cores, and then may send the RPC frame to all of them at approximately the same time. For example, in some embodiments, the system may provide broadcast functionality in the interconnect so that the RPC frame can be broadcast in a branched or waterfall manner.

Figure 9:
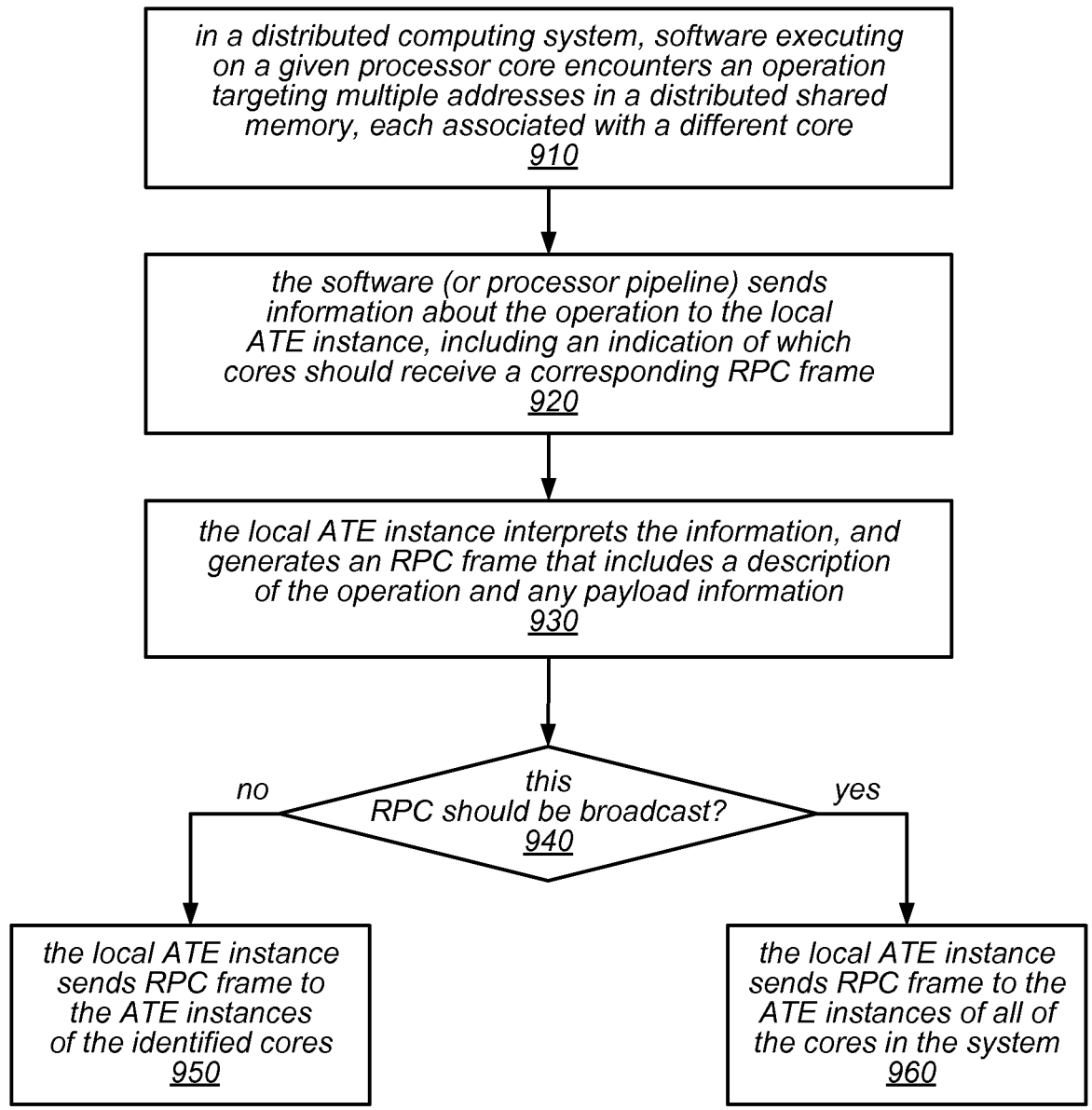
FIG. 9 is a flow diagram illustrating one embodiment of a method for implementing a broadcast or multicast RPC in a distributed computing system.

One embodiment of a method for implementing a broadcast or multicast RPC in a distributed computing system is illustrated by the flow diagram in FIG. 9. As illustrated at 910, in this example, the method may include software executing on a given processor core encountering an operation that targets multiple addresses in a distributed shared memory, each of which is associated with (or controlled by) a different core. For example, the operation may be a write operation that serves as a semaphore or another type of message that is to be broadcast to all of the processing nodes in the distributed computing system or to be multicast to some (but not all) of the processing nodes in the distributed computing system. The method may include the software (or hardware within the processor pipeline) sending information about the operation to the local ATE instance, including an indication of which processor cores should receive a corresponding RPC frame, as in 920. For example, the information provided to the local ATE instance may include an indication that the RPC should be broadcast to all processor cores or an indication of the targeted processor cores for a multicast operation (e.g., a bit vector representing the targeted cores, a pointer to a list structure whose elements identify the targeted core, or another identifier of the recipient processor cores).

As illustrated in FIG. 9, the method may include the local ATE instance interpreting the received information, and generating an RPC frame that includes a description of the operation and any applicable payload information, as in 930. If the received information indicates that this RPC should be broadcast to all processor cores in the distributed computing system (shown as the positive exit from 940), the method may include the local ATE instance sending the RPC frame to the ATE instances of all of the processor cores in the system (e.g., serially or at approximately the same time), as in 960. If, however, this RPC request is intended to be multicast to a subset of the processor cores in the distributed computing system rather than being broadcast to all of them (shown as the negative exit from 940), the method may include the local ATE instance sending the RPC frame to the ATE instances of the identified cores (e.g., serially, or at approximately the same time, if broadcasting is supported in the interconnect), as in 950. Note that, following the broadcast or multicast of an RPC frame, execution on the given processor (i.e., the processor core that issued the broadcast or multicast RPC) may continue while the ATE instances of the other cores handle the RPC frame that was sent out by the given processor core. In some cases, if the broadcast or multicast RPC is an RPC with return, the given processor core may subsequently receive (or retrieve from the DMEM) and examine responses from each of the processor cores that received the RPC frame (which, in some cases, may include itself).

In at least some embodiments, and unlike in traditional DSMs, the ATE subsystem described herein may combine message passing/inter-process communication between cores with shared data accesses. For example, to pass a message to a remote core, a local core may use an RPC construct to send the message as the payload for the RPC (for short messages that are directed to that remote core). Alternatively, the local core may assemble the message in the remote core's shared memory region using one or more ATE hardware write RPCs, after which it may issue an ATE message notify RPC (which may include the address and the size of that message) to notify the remote core that the message is ready to be read.

Note that, in various embodiments, the hardware and software mechanisms described herein for utilizing an atomic transaction engine may be applied in a system that is implemented on a single chip and that includes multiple processors (each having one or more processor cores) on the same chip. However, they may also be used in systems that include multiple processors (each having one or more processor core) that are on different processor chips one a board or on multiple boards in a system. In any of these cases, each processor core of each processor chip may be associated with a different ATE instance, and all of the ATE instances may be connected to each other over a dedicated ATE network (which may be implemented as a private low-latency bus).

In some embodiments, the ATE network may include one or more clusters of interconnect matrix components, each of which may implement a full crossbar interconnect (such as full crossbar interconnect 250 illustrated in FIG. 2). Each matrix may connect several physically close ATEs together (e.g., ATE instances corresponding to processor cores on the same chip) and may also provide connection paths to other such on-chip interconnect clusters. This arrangement may minimize the hardware costs while allowing high bandwidth connection paths within a cluster and lower aggregate bandwidth paths to all other clusters. For example, in one embodiment that includes a large number of cores, the cores may be grouped in multiple clusters, each of which includes of eight processor cores (and corresponding ATE instances).

Figure 10:
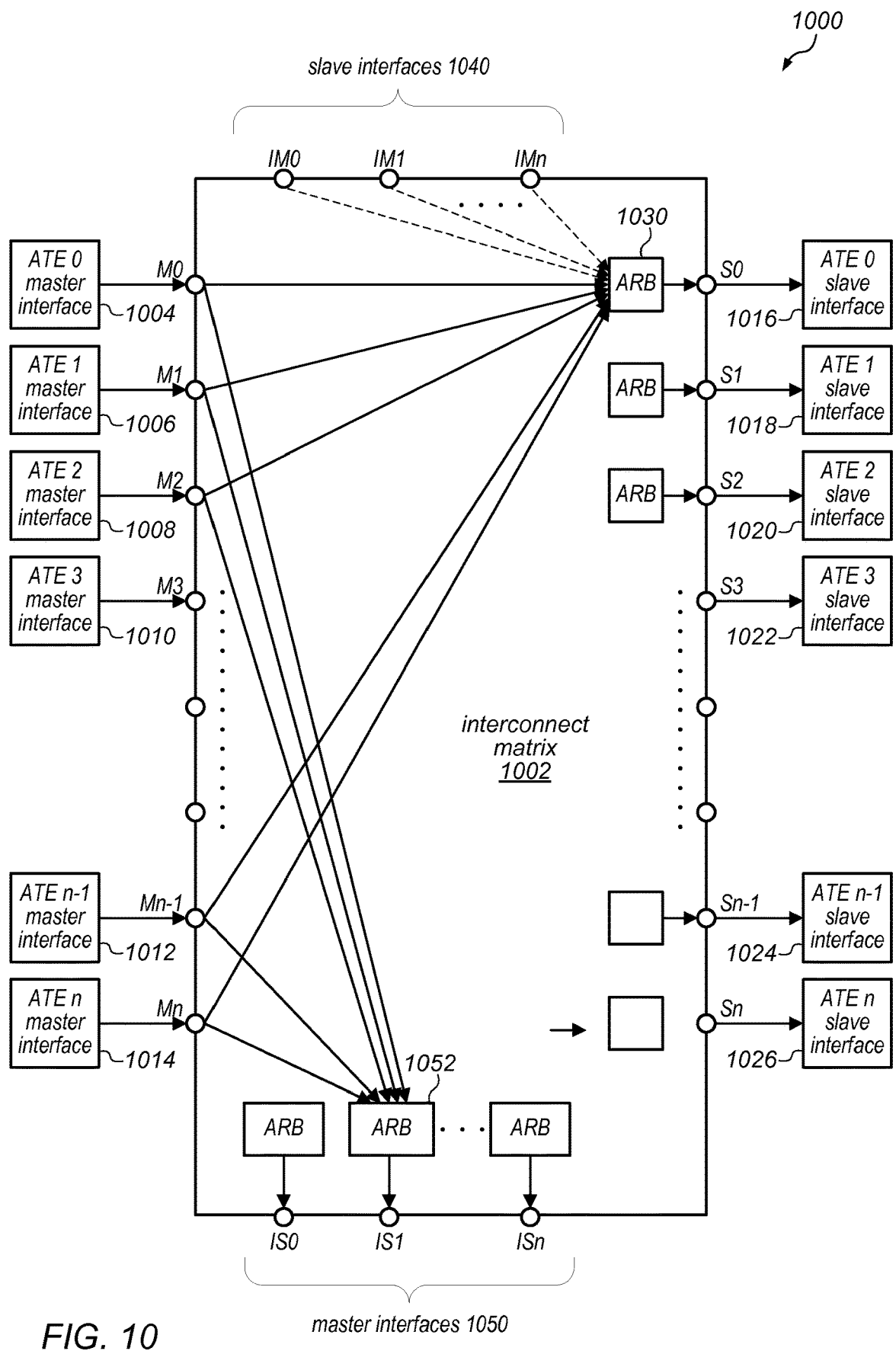
FIG. 10 is a block diagram illustrating the use of a full crossbar interconnect in a portion of a distributed computing system, according to at least some embodiments.

FIG. 10 is a block diagram illustrating the use of a full crossbar interconnect matrix in a portion of a distributed computing system, according to at least some embodiments. More specifically, FIG. 10 is a block diagram illustrating the use of interconnect matrix 1002 in a portion of a system 1000. In this example, interconnect matrix 1002 connects the ATE master interfaces 0-n (shown as elements 1004-1014 in FIG. 10) and ATE slave interfaces 0-n (shown as 1016-1026) of n ATE instances within a single cluster together. In some embodiments, each of the master interfaces 1004-1014 may be similar to master interface 242 illustrated in FIG. 2, and each of the slave interfaces 1016-1026 may be similar to slave interface 244 illustrated in FIG. 2.

In this example, interconnect matrix 1002 may have full crossbar connectivity within this cluster of n ATE instances. In addition, if one of the n ATE instances connected by interconnect matrix 1002 wants to access an ATE instance that is outside of this cluster (e.g., to send an RPC request frame or an RPC response frame to an ATE instance in another cluster of ATE instances), it may communicate with that remote ATE instance (or, more specifically, to an interconnect matrix for the cluster to which that remote ATE instance is connected) through one of the interface ports (IS0-ISn) of interconnect matrix 1002 (shown as the master interfaces 1050). More specifically, it may send an RPC request frame or an RPC response frame through one of the master interfaces 1040 to a slave interface of an interconnect matrix for another such cluster. The slave interface of the other interconnect matrix may be similar to the slave interfaces 1050 of interconnect matrix 1002 illustrated in FIG. 10. Similarly, any of the n ATE instances in this cluster may receive an RPC request from or an RPC response frame from a remote ATE instance (an ATE instance in a different cluster) through one of the slave interfaces 1040 of interconnect matrix 1002. In other words, the ATE master interfaces M0-Mn may connect to the slave ports of interconnect matrix 1002, and the master ports of interconnect matrix 1002 may connect to the ATE slave ports S0-Sn, in this example. In general, interconnect matrix 1002 may receive RPC frames from a master interface of a local ATE instance (one that is within the same cluster) and/or a master interface of a similar full crossbar interconnect of another cluster, and may send RPC frames out to a slave interface of a local ATE instance (one that is within the same cluster) and/or to a slave interface of a similar full crossbar interconnect of another cluster.

As illustrated in this example, interconnect matrix 1002 may include multiple arbiters, such as arbiter 1030 and arbiter 1052. These arbiters may be used to select between multiple processor cores (or ATE instances thereof) that may, at any given time, be trying to issue an RPC frame to another processor core (or ATE instance thereof). For example, in a system that includes eight processor cores in each cluster, it may be possible that seven of these cores might be trying to send something to the same (eighth) core. In some embodiments, it may even be possible for all eight cores to be sending something to one of the cores (e.g., if an ATE is trying to send something to itself). In any of these cases, the arbiters may be configured to determine the order in which the processor cores are able to deliver their RPC frames to a given one of the ATE instances. In some embodiments, these arbiters may be configured to attempt to keep each given RPC frame from a particular core intact as it passes through interconnect matrix 1002 (e.g., to keep RPC frames from intermingling). By avoiding intermingling and interaction between the RPC frames, each RPC frame may be handled as a continuous atomic block. Note that, in some embodiments, it may be possible for an ATE to send something to itself without having to go through the interconnect. However, in other embodiments, each ATE may be required to send all RPCs through the interconnect, even if the destination is the ATE itself.

Figure 11:
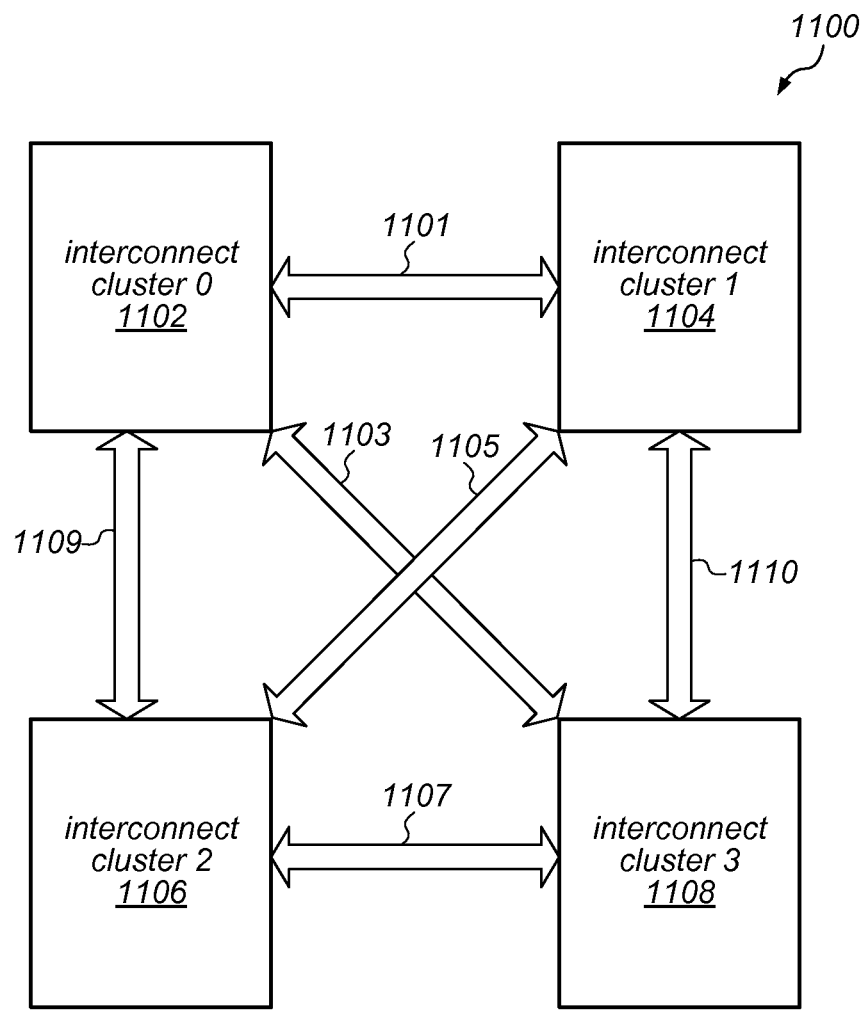
FIG. 11 is a block diagram illustrating example connectivity for a four-cluster ATE system, according to at least some embodiments.

FIG. 11 is a block diagram illustrating example connectivity for a four-cluster ATE system, according to at least some embodiments. In this example, each cluster has a full crossbar interconnect such as interconnect matrix 1002 illustrated in FIG. 10, and these interconnect matrices communicate with each other through master and slave interface ports to provide all-to-all connectivity. More specifically, the four-cluster ATE system 1100 includes four interconnect clusters 0-3 (illustrated in FIG. 11 as elements 1102, 1104, 1106, and 1108), each of which includes an interconnect matrix. In this example, each interconnect matrix includes three inter-matrix master interfaces (IM0-IM2) and three inter-matrix slave interfaces (IS0-IS2), in addition to the master and slave interfaces used to exchange messages between the ATE instances within the cluster.

For example, bus 1101 may carry messages between the master and slave interfaces of interconnect cluster 0 (1102) and interconnect cluster 1 (1104) for the benefit of the ATE instances within those clusters. Similarly, bus 1103 may carry messages between the master and slave interfaces of interconnect cluster 0 (1102) and interconnect cluster 3 (1108); bus 1105 may carry messages between the master and slave interfaces of interconnect cluster 1 (1104) and interconnect cluster 2 (1106); bus 1107 may carry messages between the master and slave interfaces of interconnect cluster 2 (1106) and interconnect cluster 3 (1108); bus 1109 may carry messages between the master and slave interfaces of interconnect cluster 0 (1102) and interconnect cluster 2 (1106); and bus 1110 may carry messages between the master and slave interfaces of interconnect cluster 1 (1104) and interconnect cluster 3 (1108).

Note that, while in several examples, the ATE instances are described as working with (or including) receive queues that are FIFO queues, in other embodiments, the receive queues may have a different structure or ordering scheme. For example, in some embodiments, the ATE instances may maintain multiple queues for the RPCs they receive and may place RPCs on various ones of the receive queues based on the cores from which they were received. In some embodiments, RPCs placed in one or multiple receive queues may be processed in an order that is based on the cores from which they were received. In some such embodiments, the ATE instance may give different priorities to RPCs from different ones of the cores. In other embodiments, there may be multiple receive queues for each source processor or for the collection of source processors, each of which stores RPCs having a similar priority. For example, there may be one receive queue for high priority RPCs and another receive queue for low priority RPCs. Other schemes for placing RPCs in different receive queues and/or for determining the order in which they are to be processed may be implemented in other embodiments.

In general, the ATE subsystems described herein may allow shared data to remain in local, low access latency data memories instead of moving it to high latency (and possibly heavily loaded) main system memory, such as DDR memory. In addition, the ATE subsystems described herein may allow fine grain control over the size of shared regions, and this size may be dynamically configured by software during runtime, in some embodiments.

Example Systems

The techniques for utilizing an atomic transaction engine, as described herein, may be further illustrated by way of an example system that includes a multiple banked memory. In various embodiments, such a system may include multiple requestors (e.g., one or more general-purpose processor cores or special-purpose processor cores, one or more direct memory access (DMA) controllers, one or more ATE instances such as those described herein, a network interface component, and/or a peripheral device), each of which may, from time to time, request access to one or more memory banks in order to perform a task. In various embodiments, the multiple banked memory may be configured as an interleaved memory or a non-interleaved memory, and a memory allocation component may be configured to arbitrate access to the various banks within the multiple banked memory, as described herein. In one example, each of multiple subsystems within the system may include a low power processor core that executes software for query processing. In this example, the query processing may be a parallelizable task, and there may be multiple processor cores in the system each executing the same code on independent partitions of the data (e.g., data in a portion of a distributed shared memory that is controlled by the processor core).

Figure 12:
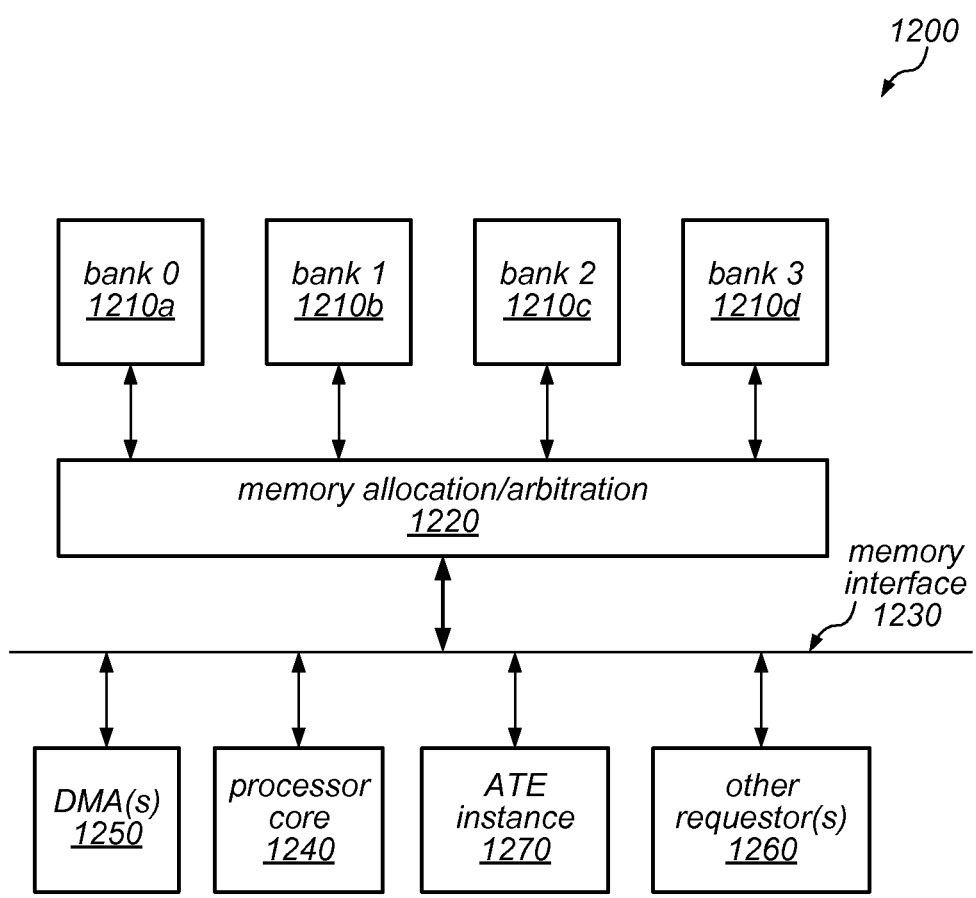
FIG. 12 is a block diagram illustrating a portion of a system that includes a shared multiple banked memory and that utilizes atomic transaction engine instances to manage and perform operations targeting the shared multiple banked memory, according to at least some embodiments.

FIG. 12 is a block diagram illustrating a portion of a system that includes a shared multiple banked memory and that utilizes atomic transaction engine instances to manage and perform operations targeting the shared multiple banked memory, according to at least some embodiments. In this example, this portion of the system (shown as subsystem 1200) includes, among other things, four memory banks (shown as memory banks 1210a-1210d) that are shared among multiple requestors and that may collectively be referred to as the DMEM, a memory allocation/arbitration component 1220 (which may be a pipelined arbiter), and a memory interface 1230 (which may include and/or perform the functions of a data bus, clock signals, word address selection, chip selection, row/column selection and/or bank selection, among other things). In this example, the potential requestors for the shared memory banks 1210 include multiple DMA components/controllers 1250, a general-purpose or special-purpose core (shown as processor core 1240), an ATE instance 1270 that is associated with processor core 1240, and one or more other requestors 1260, which may be of similar or different component types. As described herein, the ATE instances 1270 may implement a message-passing interface (e.g., one through which messages may be passed between a processor core and a corresponding direct-access memory or between two processor cores).

In this example, each of the DMA components/controllers 1250 may be a DMA engine that is configured to pre-load a particular one of memory banks 1210a-1210d with data on which processor core 1240 wants to operate. Once the data has been pre-loaded, the DMA engine may tell the processor core that it can proceed to operate on that data. When the processor core is finished operating on the data, it may tell the DMA engine, after which the DMA engine may be configured to unload the result(s) from the DMEM. In this example, the processor core 1240 may be a special-purpose core (e.g., a database processor) that has special status within the system and/or a higher priority with respect to requests for DMEM resources than one or more of the other requestors (e.g., the DMA components/controllers 1250, the ATE instance 1270, and/or the other requestors 1260). Note that, in some embodiments, memory interface 1230 and/or memory allocation/arbitration component 1220 may include one or more request buffers, which may be configured to hold requests for DMEM resources until they have been processed and/or acted upon by memory allocation/arbitration component 1220 (e.g., by granting or denying the requests). In some embodiments, the ATE instance 1270 may be associated with processor core 1240, and processor core 1240 may control a portion of the memory locations within the DMEM. As described herein, the ATE instance 1270 may communicate with other ATE instances (e.g., ATE instances in a separate subsystem) over a dedicated low-latency ATE interconnect.

In this example, not all of the requestors may be able to direct requests to all of the memory banks 1210. For example, each of the DMA components/controllers 1250 may be associated with a respective one of the memory banks 1210a-1210d, and may not be a potential requestor for any other ones of the memory banks 1210a-1210d. However, memory allocation/arbitration component 1220 may be configured to direct resource requests received from (or on behalf of) processor core 1240, ATE instance 1270, and some or all of the other requestors 1260 to any given bank, based on the addresses specified in the requests. Therefore, for each of the memory banks 1210a-1210d, there may be multiple requestors, including processor core 1240, one or more of DMA components/controllers 1250 (each of which may be a requestor for only a single one of the memory banks 1210a-1210d), ATE instance 1270, and one or more of the other requestors 1260. Note that, in some embodiments, the processor core 1240 may be able to submit 32-bit requests, which require access to only one of the memory banks 1210a-1210d, or 64-bit requests, which require access to two of the memory banks 1210a-1210d.

In this example, from a logic standpoint, each memory bank may be treated independently by the memory allocation/arbitration component 1220, and each bank may not know about the other banks Here, for the requestors that can request multiple banks, the memory allocation/arbitration component may use the address specified in each request to direct it to the appropriate memory bank. In some embodiments, ATE instance 1270 may be configured to handle RPCs issued by processor core 1240 that are directed to memory banks 1210 (or portions thereof) or that are received from another ATE instance (not shown) on behalf of a remote processor core that wishes to access memory banks 1210 (or portions thereof).

Figure 13:
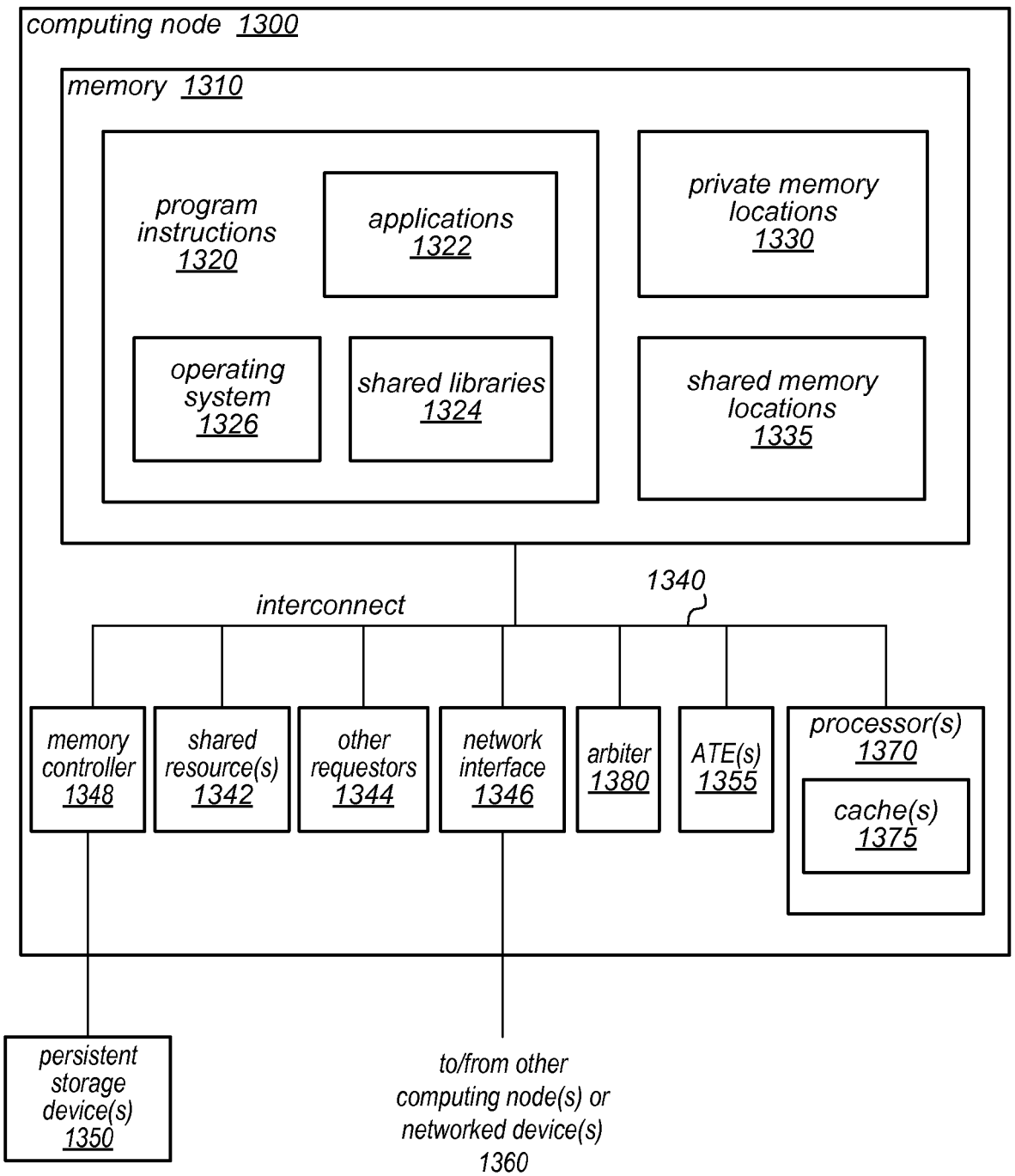
FIG. 13 illustrates a computing node that is configured to implement at least some of the methods described herein, according to various embodiments.

FIG. 13 illustrates a computing node that is configured to implement some or all of the methods described herein, according to various embodiments. The computing node 1300 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the functionality of the mechanisms for utilizing an atomic transaction engine (or an instance thereof), as described herein, may be provided as (or invoked by) a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 1300 may include one or more processors 1370; each may include multiple cores, any of which may be single or multi-threaded. For example, multiple processor cores may be included in a single processor chip (e.g., a single processor 1370), and multiple processor chips may be included on a CPU board, two or more of which may be included in computing node 1300. Each of the processors 1370 may include a hierarchy of caches 1375, in various embodiments. For example, each processor 1370 (or processor chip) may include one or more local caches (e.g., one L1 cache per processor core and/or one or more caches that are shared by multiple processor cores on a single processor chip, such as an L2 cache and/or a last level cache). As illustrated in this example, computing node 1300 may include a memory controller 1348 and/or a network interface 1346. Computing node 1300 may also include one or more shared resources 1342, one or more ATE instances 1355 (e.g., one for each processor core), one or more other requestors 1344, and a shared resource arbiter 1380 (which may be a pipelined arbiter or a non-pipelined arbiter, in different embodiments). In various embodiments, one or more of the processors 1370 may be (or include) a special-purpose processor core such as the database core described herein, and any or all of the processors 1370 may be requestors for various ones of the shared resources 1342 of computing node 1300 and/or for shared memory locations 1335. In some embodiments, shared memory locations 1335 may include a multiple banked memory, such as the DMEM described above, access to which may be requested by any one or more of the processors 1370, ATE instances 1355, and/or other requestors 1344. The ATEs 1355 may be configured to implement some or all of the techniques described herein for controlling and performing accesses to shared memory locations 1335 that are received from other ATE instances 1355 and/or processors 1370. The arbiter 1380 may be configured to control accesses to other shared resources 1342 that are received from multiple ones of the ATE instances 1355 or other requestors 1344 and/or processors 1370.

As illustrated in FIG. 13, computing node 1300 may also include or have access to one or more persistent storage devices 1350 (e.g. optical storage, magnetic storage, hard drive, tape drive, solid state memory, etc., that is external to, but accessible by, computing node 1300), and one or more system memories 1310 (e.g., one or more of cache, SRAM, DRAM, RDRAM, EDO RAM, DDR 10 RAM, SDRAM, Rambus RAM, EEPROM, etc.). In some embodiments, system memory 1310 may store a portion of a data set for an application on which processor(s) 1370 may operate locally (e.g., using RPCs generated as described herein, in some cases). For example, memory 1310 on computing node 1300 may include local storage (e.g., within private memory locations 1330 or shared memory locations 1335) for data structures, elements of which may be the targets of various functions of an application. In some embodiments, memory 1310 may include persistent storage (e.g., for storing firmware or configuration parameter values that are fixed for a given computing node or a given set of configuration registers). In other embodiments, configuration registers or configuration parameters stored in system memory 1300 may be programmable (e.g., at runtime). Various embodiments of computing node 1300 may include fewer or additional components not illustrated in FIG. 13 (e.g., video cards, audio cards, additional network interfaces, peripheral devices, a network interface such as an ATM interface, an Ethernet interface, a Frame Relay interface, etc.)

In this example, the one or more processors 1370, the memory controller 1348 (which may provide access to storage devices 1350), the shared resources 1342, the ATE instances 1355, the other requestors 1344, the arbiter 1380, the network interface 1346, and the system memory 1310 may be coupled to the system interconnect 1340. One or more of the system memories 1310 may contain program instructions 1320. Program instructions 1320 may be executable to implement one or more applications 1322 (which may include all or a portion of an application that access shared memory in order to perform functions thereof), shared libraries 1324, or operating systems 1326. Program instructions 1320 may be encoded in platform native binary, any interpreted language such as Java' bytecode, or in any other language such as C/C++, Java™, etc. or in any combination thereof. The program instructions 1320 may include functions, operations and/or other processes for performing or initiating the performance of various RPCs, as described herein. Such support and functions may exist in one or more of the shared libraries 1324, operating systems 1326, or applications 1322, in various embodiments. The system memory 1310 may further comprise private memory locations 1330 and/or shared memory locations 1335 where data (including portions of a data set for an application 1322 and/or various configuration parameter values) may be stored. For example, private memory locations 1330 and/or shared memory locations 1335 may store data accessible to concurrently executing threads, processes, or transactions, in various embodiments. In addition, the system memory 1310 and/or any of the caches of processor(s) 1370 may, at various times, store data that has been fetched (or prefetched) from one of system memories 1310 and/or from storage devices 1350 by (or on behalf of) an application executing on computing node 1300. Note that the system memory 1310 and/or any of the caches of processor(s) 1370 may, at various times, store any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of memories, processor cores and/or requestors, it should be noted that the techniques and mechanisms disclosed herein for utilizing atomic transaction engines (or instances thereof) may be applicable in other contexts in which multiple processors operate on a shared memory. It is intended that the following claims be interpreted to embrace all such variations and modifications.

What is claimed:

1. A method, comprising:
    executing an instruction of a distributed application by executing on a plurality of processor cores, the instruction comprising an operation accessing a distributed shared random access memory controlled by respective atomic transaction engine instances coupled to the plurality of processor cores via respective memory interfaces;
    wherein the respective atomic transaction engine instances each control a respective portion of the distributed shared random access memory implemented in a portion of its respective non-shared random access memory coupled via a respective memory arbitration component to the respective memory interface, wherein the respective memory arbitration component and the respective atomic transaction engine instance are different;
    wherein the respective atomic transaction engine instances communicate with each other over an interconnect; and
    wherein executing the instruction comprises:
        identifying, by a first processor core of the plurality of processor cores executing the instruction, that the access operation targets a location in the distributed shared random access memory;
        sending, by the first processor core responsive to the identifying, parameters for the access operation via the respective memory interface to a first atomic transaction engine instance of the respective atomic transaction engine instances coupled to the first processor core;
        determining, by the first atomic transaction engine instance based on the parameters received, that the targeted location of the distributed shared random access memory is controlled by a second atomic transaction engine instance of respective atomic transaction engine instances;
        generating, by the first atomic transaction engine instance based on the parameters received, request frame, wherein the request frame comprises a descriptor and an identifier of the targeted location in the distributed shared random access memory, and wherein the descriptor comprises an identifier of the access operation type; and
        responsive to the determining:
            providing, via the interconnect by the first atomic transaction engine instance, the request frame to the second atomic transaction engine instance; and
            performing the access operation by the second atomic transaction engine instance, or initiating, by the second atomic transaction engine instance, performance of the access operation by a second processor core of the plurality of processor cores.

2. The method of claim 1, wherein said identifying comprises:
    determining, by executing program instructions within the distributed application, that the access operation targets a location in the distributed shared random access memory or that the access operation is to be performed by remote execution; or
    determining, by pipeline circuitry within the first processor core, that the access operation targets a location in the distributed shared random access memory or that the access operation is to be performed by remote execution.

3. The method of claim 1, further comprising:
    executing, by the first processor core subsequent to providing the request frame to the second atomic transaction engine instance, one or more additional instructions comprising access operations of the distributed application;
    issuing, by the first processor core subsequent to executing the one or more additional instructions of the distributed application, an instruction to wait for an event, wherein the event comprises receiving a response frame from the second atomic transaction engine instance.

4. The method of claim 1, further comprising:
receiving, by the first atomic transaction engine instance from the second atomic transaction engine instance, a response frame comprising response data for the access operation; and
in response to said receiving:
returning, by the first atomic transaction engine instance, the response data to the first processor core; or
writing, by the first atomic transaction engine instance, the response data to a location in memory from which the first processor core expects to retrieve it.

5. The method of claim 1,
wherein the access operation targets multiple portions of the distributed shared random access memory, each associated with a different one of multiple ones of the plurality of processor cores, or represents a message to be sent to multiple ones of the plurality of processor cores; and
wherein said providing comprises providing the request frame to the atomic transaction engine instances coupled to the multiple ones of the plurality of processor cores.

6. A system, comprising:
a plurality of processor cores;
a plurality of atomic transaction engine instances, each coupled via a respective memory interface to a respective one of the plurality of processor cores, wherein the plurality of atomic transaction engine instances communicate with each other over an interconnect; and
a distributed shared random access memory;
wherein each of the plurality of atomic transaction engine instances controls a respective portion of the distributed shared random access memory implemented in a respective non-shared random access memory coupled via a respective memory arbitration component to the respective memory interface, wherein the respective memory arbitration component and the respective atomic transaction engine instance are different, and wherein access to the distributed shared random access memory by the plurality of processor cores is provided via the respective memory interfaces by the respective atomic transaction engine instances;
wherein a first processor core of the plurality of processor cores comprises circuitry configured to:
identify an access operation of an executing instruction that targets a location of data that is in the distributed shared random access memory; and
send, responsive to the identifying, parameters for the access operation via the respective memory interface to a first atomic transaction engine instance of the plurality of atomic transaction engine instances coupled to the first processor core;
wherein a second atomic transaction engine instance of the atomic transaction engine instances coupled to a second processor core of the plurality of processor cores comprises circuitry configured to:
receive a request frame from the first atomic transaction engine instance via the interconnect, wherein the received request frame comprises a descriptor, based at least in part on the parameters for the access operation, that identifies the access operation of a given access operation type and an identifier of the location of the data in the distributed shared random access memory that is targeted by the access operation and that is controlled by the second atomic transaction engine instance; and
perform the identified access operation or initiate the performance of the identified access operation by the second processor core coupled to the one of the atomic transaction engine instances.

7. The system of claim 6,
wherein, in response to receiving the request frame, the second atomic transaction engine instance is configured to place the received request frame in a receive queue for the second atomic transaction engine instance; and
wherein to perform the identified access operation, the second atomic transaction engine instance is configured to:
retrieve the received request frame from the receive queue;
determine whether or not the identified access operation is executable by circuitry within the second atomic transaction engine instance without intervention by the second processor core; and
execute the identified access operation in response to determining that the identified access operation is executable by circuitry within the second atomic transaction engine instance without intervention by the second processor core; and
wherein the second atomic transaction engine instance is configured to execute the identified access operation atomically.

8. The system of claim 7, wherein during execution of the identified access operation, the second atomic transaction engine instance is configured to collect response data associated with execution of the identified access operation.

9. The system of claim 7,
wherein the second atomic transaction engine instance comprises circuitry configured to execute access operations of a plurality of access operation types; and
wherein to determine whether or not the identified access operation is executable by circuitry within the second atomic transaction engine instance without intervention by the second processor core, the second atomic transaction engine instance is configured to determine whether or not the given access operation type is one of the plurality of access operation types executable by circuitry within second atomic transaction engine instance.

10. The system of claim 9, wherein the identified access operation is one of a sequence of access operations identified by information in the received request frame, each of which is of an access operation type that is executable by circuitry within the second atomic transaction engine instance.

11. The system of claim 7,
wherein the second atomic transaction engine instance is configured to initiate the performance of the identified access operation by the second processor core in response to determining that the identified access operation is not executable by circuitry within the second atomic transaction engine instance without intervention by the second processor core; and
wherein to initiate the performance of the identified access operation by the second processor core, the second atomic transaction engine instance is configured to:
write information about the identified access operation into one or more storage locations that are accessible to the second processor core; and
issue an interrupt to the second processor core indicating that the identified access operation should be executed by the second processor core.

12. The system of claim 11, wherein, in response to the interrupt, the second processor core is configured to perform the identified access operation.

13. The system of claim 6, wherein the second atomic transaction engine instance is further configured to:
generate an response frame associated with execution of the identified access operation; and
return the response frame to the first atomic transaction engine instance.

14. A system, comprising:
a plurality of processor cores;
a plurality of atomic transaction engine instances, each coupled via a respective memory interface to a respective one of the plurality of processor cores, wherein the plurality of atomic transaction engine instances communicate with each other over an interconnect; and
a distributed shared random access memory;
wherein each of the plurality of atomic transaction engine instances controls a respective portion of the distributed shared random access memory implemented in a respective non-shared random access memory coupled via a respective memory arbitration component to the respective memory interface, wherein the respective memory arbitration component and the respective atomic transaction engine instance are different, and wherein access to the distributed shared random access memory by the plurality of processor cores is provided via the respective memory interfaces by the respective atomic transaction engine instances;
wherein a first processor core of the plurality of processor cores comprises circuitry configured to:
identify an access operation of an executing instruction that targets a location of data that is in the distributed shared random access memory; and
send, responsive to the identifying, parameters for the access operation via the respective memory interface to a first atomic transaction engine instance of the plurality of atomic transaction engine instances coupled to the first processor core;
wherein one of the atomic transaction engine instances comprises circuitry configured to:
receive a request frame from a receive queue that is local to the one of the atomic transaction engine instances, wherein the request frame identifies the access operation that targets the location of the data in the distributed shared random access memory that is controlled by the processor core coupled to the one of the atomic transaction engine instances;
execute the identified access operation.

15. The system of claim 14, wherein the request frame was generated by another one of the atomic transaction engine instances on behalf of the processor core coupled to the other one of the atomic transaction engine instances and was communicated to the one of the atomic transaction engine instances by the other one of the atomic transaction engine instances for processing.

16. The system of claim 14, wherein the request frame was generated by the one of the atomic transaction engine instances on behalf of the first processor core coupled to the one of the atomic transaction engine instances and was placed in the receive queue by the one of the atomic transaction engine for processing.

17. The system of claim 14,
wherein the receive queue is one of multiple receive queues that is local to the one of the atomic transaction engine instances; and
wherein each of the multiple receive queues stores request frames received from respective different ones of the plurality of atomic transaction engine instances or stores request frames comprising access operations of different types or having different priorities.

18. The system of claim 14,
wherein the interconnect is a dedicated low-latency interconnect.

19. The system of claim 14,
wherein the system comprises two or more clusters of processor cores, each cluster comprising multiple processor cores and a respective crossbar over which the atomic transaction instances coupled to each of the multiple processor cores communicate with each other; and
wherein the atomic transaction instances coupled to the processor cores in each of the clusters communicate with atomic transaction instances coupled to processor cores in other ones of the clusters over an interconnect between the respective crossbars.

20. The system of claim 14,
wherein the first processor core comprises address decode circuitry configured to determine whether or not an access operation targets a location in the distributed shared random access memory; and
wherein the first processor core is further configured to:
in response to the identifying:
refrain from advancing the access operation within pipeline circuitry of the first processor core.

\* \* \* \* \*

UNITED STATES PATENT AND TRADEMARK OFFICE
CERTIFICATE OF CORRECTION

| | |
|---|---|
| PATENT NO. | : 10,732,865 B2 |
| APPLICATION NO. | : 14/863354 |
| DATED | : August 4, 2020 |
| INVENTOR(S) | : Jain et al. |

Page 1 of 1

It is certified that error appears in the above-identified patent and that said Letters Patent is hereby corrected as shown below:

On the Title Page

On page 2, Column 1, under Other Publications, Line 3, delete "retrived" and insert -- retrieved --, therefor.

In the Specification

In Column 4, Line 29, after "instance" insert -- . --.

In Column 12, Line 30, delete "no" and insert -- an --, therefor.

In Column 13, Line 61, delete "RCPNR" and insert -- RPCNR --, therefor.

In Column 16, Line 60, delete "that that" and insert -- that --, therefor.

In Column 20, Line 32, delete "RCPWR)," and insert -- RPCWR), --, therefor.

In the Claims

In Column 29, Line 56, in Claim 1, after "application" delete "by".

In Column 29, Line 66, in Claim 1, before "respective" delete "portion of its".

In Column 30, Line 24, in Claim 1, after "of" insert -- the --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*